(12) United States Patent
Yoshida et al.

(10) Patent No.: US 9,080,311 B2
(45) Date of Patent: Jul. 14, 2015

(54) CONSTRUCTION MACHINE

(71) Applicant: HITACHI CONSTRUCTION MACHINERY CO., LTD., Tokyo (JP)

(72) Inventors: Hajime Yoshida, Omihachiman (JP); Hajime Ishii, Higashiomi (JP); Yoshifumi Takebayashi, Koka (JP); Shuuhei Noguchi, Higashiomi (JP); Hajime Kurikuma, Koka (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 0 days.

(21) Appl. No.: 14/351,335

(22) PCT Filed: Nov. 19, 2012

(86) PCT No.: PCT/JP2012/079942
§ 371 (c)(1),
(2) Date: Apr. 11, 2014

(87) PCT Pub. No.: WO2013/080825
PCT Pub. Date: Jun. 6, 2013

(65) Prior Publication Data
US 2014/0290237 A1    Oct. 2, 2014

(30) Foreign Application Priority Data
Nov. 29, 2011 (JP) .................. 2011-260246

(51) Int. Cl.
| | |
|---|---|
| F01N 3/00 | (2006.01) |
| E02F 9/22 | (2006.01) |
| F04B 49/06 | (2006.01) |
| F01N 3/023 | (2006.01) |
| F02D 29/04 | (2006.01) |
| E02F 3/32 | (2006.01) |
| E02F 9/20 | (2006.01) |
| F02D 41/02 | (2006.01) |
| F01N 11/00 | (2006.01) |
| F04B 49/20 | (2006.01) |

(52) U.S. Cl.
CPC ............... *E02F 9/2235* (2013.01); *E02F 3/325* (2013.01); *E02F 9/2095* (2013.01);
(Continued)

(58) Field of Classification Search
CPC ..... F02D 41/029; F01N 9/002; F01N 3/0842; F01N 3/035; F01N 13/02
USPC ............ 60/286, 287, 295, 297, 311, 452, 422
See application file for complete search history.

(56) References Cited

U.S. PATENT DOCUMENTS

| | | |
|---|---|---|
| 5,394,697 A | 3/1995 | Hirata |
| 2010/0089035 A1 | 4/2010 | Kamiya et al. |

(Continued)

FOREIGN PATENT DOCUMENTS

| | | |
|---|---|---|
| EP | 2354330 A1 * | 8/2011 |
| JP | 07-166840 A | 6/1995 |

(Continued)

*Primary Examiner* — Thomas Denion
*Assistant Examiner* — Patrick Maines
(74) *Attorney, Agent, or Firm* — Mattingly & Malur, PC

(57) ABSTRACT

A control pressure switching valve is disposed between a displacement regulator and a pressure control valve. The control pressure switching valve is switched between a control position (j), in which a load sensing control pressure (PLS) is permitted to be outputted from the pressure control valve to the displacement regulator, and a control release position (k), in which the load sensing control pressure (PLS) to be outputted to the displacement regulator is reduced to a prescribed low pressure value. When the regeneration of a filter is determined to be necessary, the controller switches the control pressure switching valve to the control release position (k). When the load sensing control pressure (PLS) is reduced to the low pressure value with the control pressure switching valve switched to the control release position (k), the displacement regulator increases a delivery displacement of a hydraulic pump, thereby increasing rotational load of an engine.

5 Claims, 11 Drawing Sheets

(52) U.S. Cl.
CPC ............ *E02F 9/2217* (2013.01); *E02F 9/2225* (2013.01); *E02F 9/2246* (2013.01); *E02F 9/2285* (2013.01); *F01N 3/023* (2013.01); *F01N 11/002* (2013.01); *F02D 29/04* (2013.01); *F02D 41/029* (2013.01); *F04B 49/06* (2013.01); *F04B 49/20* (2013.01); *F02D 2041/026* (2013.01)

(56) References Cited

U.S. PATENT DOCUMENTS

| | | | |
|---|---|---|---|
| 2011/0000197 A1* | 1/2011 | Kamiya et al. | 60/295 |
| 2011/0173958 A1* | 7/2011 | Masuda et al. | 60/285 |
| 2012/0227388 A1* | 9/2012 | Asakage et al. | 60/311 |
| 2013/0227936 A1* | 9/2013 | Takahashi et al. | 60/297 |
| 2013/0269320 A1* | 10/2013 | Kwak et al. | 60/274 |
| 2014/0046552 A1* | 2/2014 | Tsuruga et al. | 701/50 |
| 2014/0052350 A1* | 2/2014 | Tsuruga et al. | 701/50 |
| 2014/0165543 A1* | 6/2014 | Takebayashi et al. | 60/311 |

FOREIGN PATENT DOCUMENTS

| | | |
|---|---|---|
| JP | 3073380 B2 | 6/2000 |
| JP | 2001-193705 A | 7/2001 |
| JP | 3854027 B2 | 9/2006 |
| JP | 2009-079500 A | 4/2009 |
| JP | 2011038464 A * | 2/2011 |
| JP | 2011-052669 A | 3/2011 |
| WO | 93/18308 A1 | 9/1993 |

* cited by examiner

CONSTRUCTION MACHINE

TECHNICAL FIELD

The present invention relates to a construction machine represented by, for example, a hydraulic excavator, a hydraulic crane and a wheel loader, more particularly, relates to a construction machine adapted to perform load sensing control.

BACKGROUND ART

As a construction machine represented by a hydraulic excavator, there has been known the one in which the delivery displacement of a variable displacement type hydraulic pump, which serves as a hydraulic source, can be variably controlled so that load pressures of a plurality of hydraulic actuators (namely, various hydraulic cylinders of a working mechanism and hydraulic motors for revolving or traveling) can be load sensed and the pressurized oil can be supplied to the hydraulic actuators in a flow rate corresponding to the load pressures (Patent Document 1).

In addition, as an engine serving as a prime mover of the construction machine, a diesel engine is generally used. In an exhaust gas discharged from the diesel engine, there may be present a harmful substance containing, for example, particulate matter (PM) or nitrogen oxides ($NO_x$). Therefore, in the construction machine represented by a hydraulic excavator, an exhaust gas purifying device is provided in an exhaust pipe constituting an exhaust gas passage of the engine.

The exhaust gas purifying device is provided with an after-treatment device composed of an oxidation catalyst (generally called "Diesel Oxidation Catalyst" or "DOC" for short) which oxidizes and removes nitrogen monoxide (NO), carbon monoxide (CO) and hydrocarbon (HC) contained in the exhaust gas and a particulate matter removing filter (generally called "Diesel Particulate Filter" or "DPF" for short) which is disposed downstream of the oxidation catalyst to collect and remove particulate matter in the exhaust gas (Patent Document 2).

When a large amount of particulate matter in the exhaust gas is collected by and adhered to the particulate matter removing filter, the filter has to be subjected to a regeneration process. In this case, in nitrogen dioxides ($NO_2$) region, the particulate matter can be burned with the exhaust gas at a temperature as high as 250 to 300 degrees or more, for example. Thus, the particulate matter can be removed from the particulate matter removing filter, achieving the regeneration of the filter.

PRIOR ART DOCUMENT

Patent Document

Patent Document 1: Japanese Patent Laid-Open No. 2001-193705 A (Japanese Patent No. 3854027)
Patent Document 2: Japanese Patent Laid-Open No. 2011-52669 A

SUMMARY OF THE INVENTION

However, in the above-mentioned conventional art of Patent Document 1, the delivery displacement of the variable displacement type hydraulic pump, which serves as a hydraulic source, is variably controlled by load sensing. Therefore, during a non-operation time (hereinafter referred to as "unload time") when all hydraulic actuators are stationary, the delivery displacement of the hydraulic pump is controlled to a flow rate close to a minimum, reducing the rotational load of the engine. In a case where the rotational load of the engine is small as described above, the temperature of the exhaust gas may drop below a temperature required for the filter regeneration of the particulate matter removing filter.

Therefore, in the construction machines adapted to perform load sensing control, when the rotational load of the engine becomes small during the unload time of the hydraulic actuators, it becomes difficult to properly perform the filter regeneration process of the particulate matter removing filter. Consequently, there is a problem that the lifetime and reliability of the exhaust gas purifying device are decreased.

In view of the above-mentioned problem in the conventional art, it is an object of the present invention to provide a construction machine in which energy savings can be promoted by adopting load sensing control, while rotational load of an engine can be increased according to need so as to raise the temperature of an exhaust gas to a required temperature, ensuring removal of particulate matter at an exhaust gas purifying device.

(1) In order to solve the above-described problem, the present invention is applied to a construction machine, comprising: an engine being a prime mover, an exhaust gas purifying device disposed at an exhaust side of the engine and having a filter for purifying an exhaust gas, a pressure detector disposed in the exhaust gas purifying device to detect a differential pressure between the front and rear sides of the filter, a variable displacement type hydraulic pump driven by the engine, and having a displacement variable portion, a displacement regulator configured to variably control a delivery displacement of a pressurized oil by the hydraulic pump, a hydraulic actuator driven by the pressurized oil delivered from the hydraulic pump, a directional control valve configured to control a flow rate of the pressurized oil supplied from the hydraulic pump to the hydraulic actuator, a pressure control valve configured to output a load sensing control pressure to the displacement regulator such that a delivery pressure of the hydraulic pump becomes higher than a maximum load pressure of the hydraulic actuator by a target differential pressure, and a controller configured not only to control rotation of the engine but also to perform a filter regeneration process.

The configuration adopted in the present invention is characterized in that a control pressure switching valve configured to be switched by a control signal from the controller to either a control position, in which the load sensing control pressure is permitted to be outputted without any change from the pressure control valve to the displacement regulator, or a control release position, in which the load sensing control pressure to be outputted to the displacement regulator is reduced to a prescribed low pressure value, is disposed between the displacement regulator and the pressure control valve, that when the regeneration of the filter is determined to be necessary based on the differential pressure between the front and rear sides of the filter detected by the pressure detector, the controller outputs the control signal, thereby switching the control pressure switching valve from the control position to the control release position, and that when the load sensing control pressure is reduced to the low pressure value with the control pressure switching valve switched from the control position to the control release position, the displacement regulator increases the delivery displacement of the hydraulic pump so as to raise a temperature of the exhaust gas of the engine to a temperature required for the regeneration of the filter, thereby increasing rotational load of the engine.

With this arrangement, until the exhaust gas purifying device reaches the time when the filter should be regenerated, the control pressure switching valve disposed between the displacement regulator and the pressure control valve can output the load sensing control pressure without any change from the pressure control valve to the displacement regulator. Therefore, the displacement regulator can control the delivery displacement of the hydraulic pump such that the delivery pressure of the hydraulic pump becomes higher than the maximum load pressure of the hydraulic actuator by a target differential pressure, and thus energy savings can be promoted. On the other hand, during an unload time when the hydraulic actuator is stationary, the displacement regulator can reduce the rotational load of the engine by controlling the delivery displacement of the variable displacement type hydraulic pump to a flow rate close to a minimum, which also promotes energy savings.

Furthermore, when the filter reaches the time to be regenerated, the load sensing control pressure to be outputted from the pressure control valve to the displacement regulator can be reduced to a prescribed low pressure value by switching the control pressure switching valve from the control position to the control release position. Therefore, the displacement regulator can increase the delivery displacement of the hydraulic pump to be a large volume, thereby increasing the rotational load of the engine. As a result, the temperature of the exhaust gas of the engine can be raised to a temperature required for the regeneration of the filter, so that the removal of particulate matter at the exhaust gas purifying device can be ensured by properly performing the regeneration of the filter.

(2) The present invention comprises an operation detector for detecting whether or not the directional control valve is in a neutral position, wherein when the operation detector detects that the directional control valve is in the neutral position and the regeneration of the filter is determined to be necessary, the controller outputs the control signal to switch the control pressure switching valve from the control position to the control release position.

With this arrangement, the unload time when the hydraulic actuator is stationary can be recognized by detecting whether or not the directional control valve is in the neutral position with the operation detector. During the unload time, the load sensing control pressure can be reduced to the low pressure value by switching the control pressure switching valve from the control position to the control release position. This results in increasing the delivery displacement of the hydraulic pump, thereby increasing the rotational load of the engine. Therefore, the temperature of the exhaust gas of the engine can be raised to a temperature required for the regeneration of the filter.

(3) The present invention comprises an operation lock detector for detecting whether or not the directional control valve is locked in a neutral position, wherein when the operation lock detector detects that the directional control valve is locked in the neutral position and the regeneration of the filter is determined to be necessary, the controller outputs the control signal to switch the control pressure switching valve from the control position to the control release position.

With this arrangement, the unload time when the hydraulic actuator is stationary can be recognized by detecting whether or not the directional control valve is locked in the neutral position with the operation lock detector, and also in this case, the delivery displacement of the hydraulic pump can be increased by switching the control pressure switching valve from the control position to the control release position, thereby increasing the rotational load of the engine.

(4) According to the present invention, the displacement variable portion of the hydraulic pump is configured to be tilted by the displacement regulator to vary the delivery displacement of the pressurized oil, and the hydraulic pump is provided with a tilting position limiting device configured to permit the displacement variable portion to be tilted by the displacement regulator between a maximum tilting position and a minimum tilting position as long as the control pressure switching valve is being held in the control position but limit a tilting position of the displacement variable portion within a prescribed range in a case where the control pressure switching valve is switched from the control position to the control release position by the control signal from the controller.

With this arrangement, during the unload time when the hydraulic actuator is stationary, the tilting position limiting device can limit the tilting position of the displacement variable portion within a prescribed range by switching the control pressure switching valve from the control position to the control release position. Therefore, the delivery displacement of the hydraulic pump can be prevented from increasing more than necessary, and the rotational load of the engine can be increased within a range where the temperature of the exhaust gas of the engine can be raised to a temperature required for the regeneration of the filter.

(5) The present invention has a plurality of the hydraulic actuators and a plurality of the directional control valves, as well as a plurality of pressure compensating valves for controlling each differential pressure between the front and rear sides of the plurality of directional control valves, wherein the pressure control valve controls the load sensing control pressure to be higher than the maximum load pressure of the plurality of hydraulic actuators by a target differential pressure.

With this arrangement, the a plurality of hydraulic actuators can be respectively controlled by their directional control valves, so that a plurality of the pressure compensating valves can control each differential pressure between the front and rear sides of the respective directional control valves. The pressure control valve can control the load sensing control pressure to be higher than the maximum load pressure of the plurality of hydraulic actuators by a target differential pressure.

MODE FOR CARRYING OUT THE INVENTION

Figure 1:
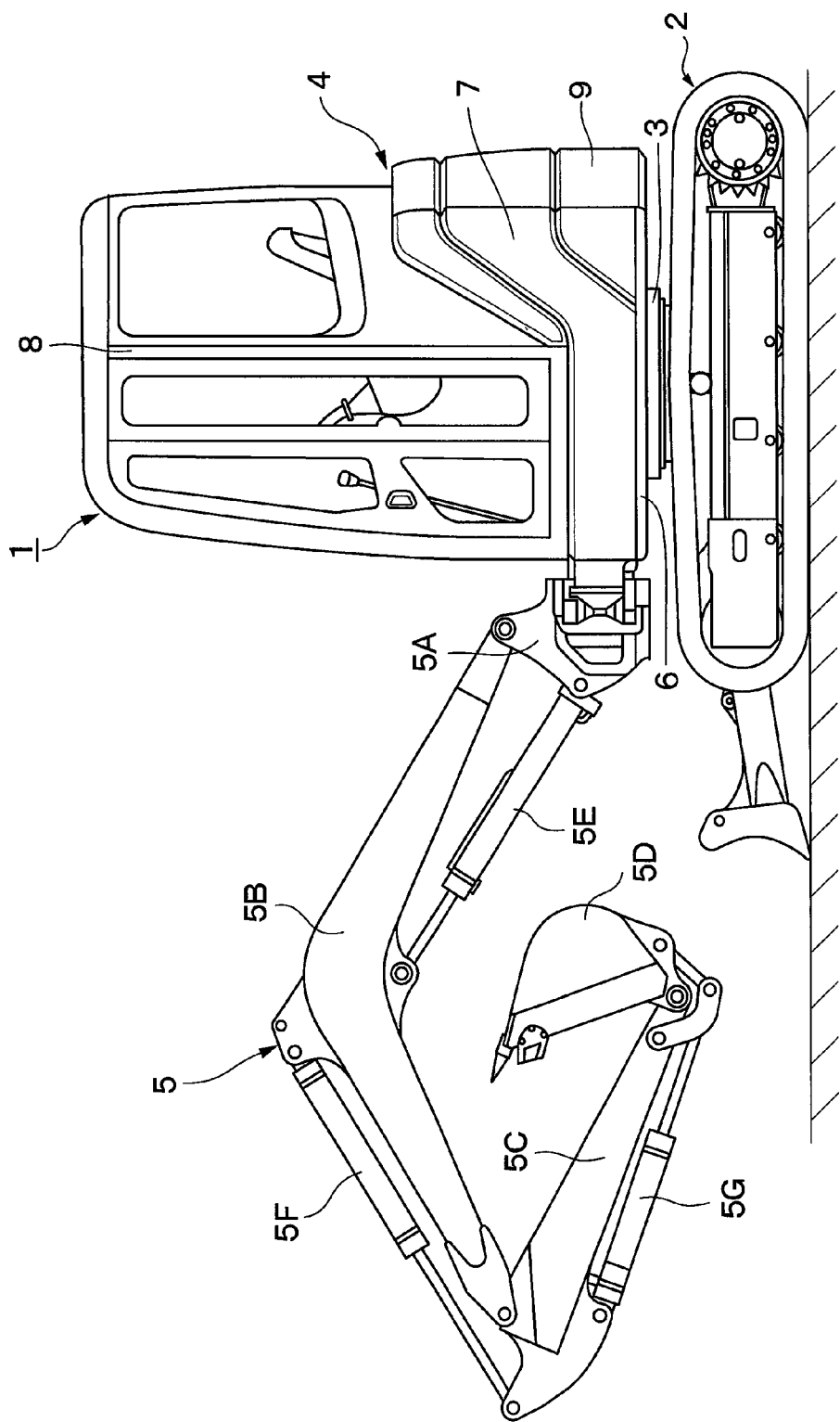
FIG. 1 is a front view showing a hydraulic excavator used in a first embodiment of the present invention.

Hereinbelow, a small-sized hydraulic excavator, which is taken as an example of a construction machine according to the embodiment of the present invention, will be described in detail with reference to the accompanying drawings.

Herein, FIGS. 1 to 8 show a hydraulic excavator equipped with an exhaust gas purifying device according to a first embodiment of the present invention.

In the drawings, designated at 1 is a small-sized hydraulic excavator to be used for excavating operation of earth and sand. The hydraulic excavator 1 is generally composed of an automotive crawler type lower traveling structure 2, an upper revolving structure 4 rotatably mounted on the lower traveling structure 2 through a revolving device 3 to constitute the vehicle body together with the lower traveling structure 2, and a working mechanism 5 liftably provided at the front side of the upper revolving structure 4.

In this case, the working mechanism 5 is constituted as a swing post type working mechanism having a swing post 5A, a boom 5B, an arm 5C, a bucket 5D that serves as a working tool, a swing cylinder (not shown), a boom cylinder 5E, an arm cylinder 5F and a bucket cylinder 5G, for example. In addition, the upper revolving structure 4 is composed of a below-mentioned revolving frame 6, an exterior cover 7, a cab 8, a counterweight 9, and the like.

The revolving frame 6 is a support structure of the upper revolving structure 4, the revolving frame 6 being attached to the lower traveling structure 2 through the revolving device 3. The revolving frame 6 is provided with the below-mentioned counterweight 9 and engine 10 at its rear part side and the below-mentioned cab 8 at its left front side. Moreover, the revolving frame 6 is provided with the exterior cover 7 between the cab 8 and the counterweight 9, and in the exterior cover 7, a fuel tank and various types of control valves (none of which are shown) are housed in addition to the engine 10, a hydraulic pump 13, an operating oil tank 14 and a heat exchanger 15.

The cab 8 is mounted on the left front side of the revolving frame 6, the cab 8 defining therein an operator's room on which the operator boards. Inside the cab 8, there are arranged an operator's seat on which the operator is seated and various types of operating levers (an operating lever associated with a below-mentioned pilot valve 48 shown in FIG. 3 and a gate lock lever for operating a gate lock valve 49).

Figure 2:
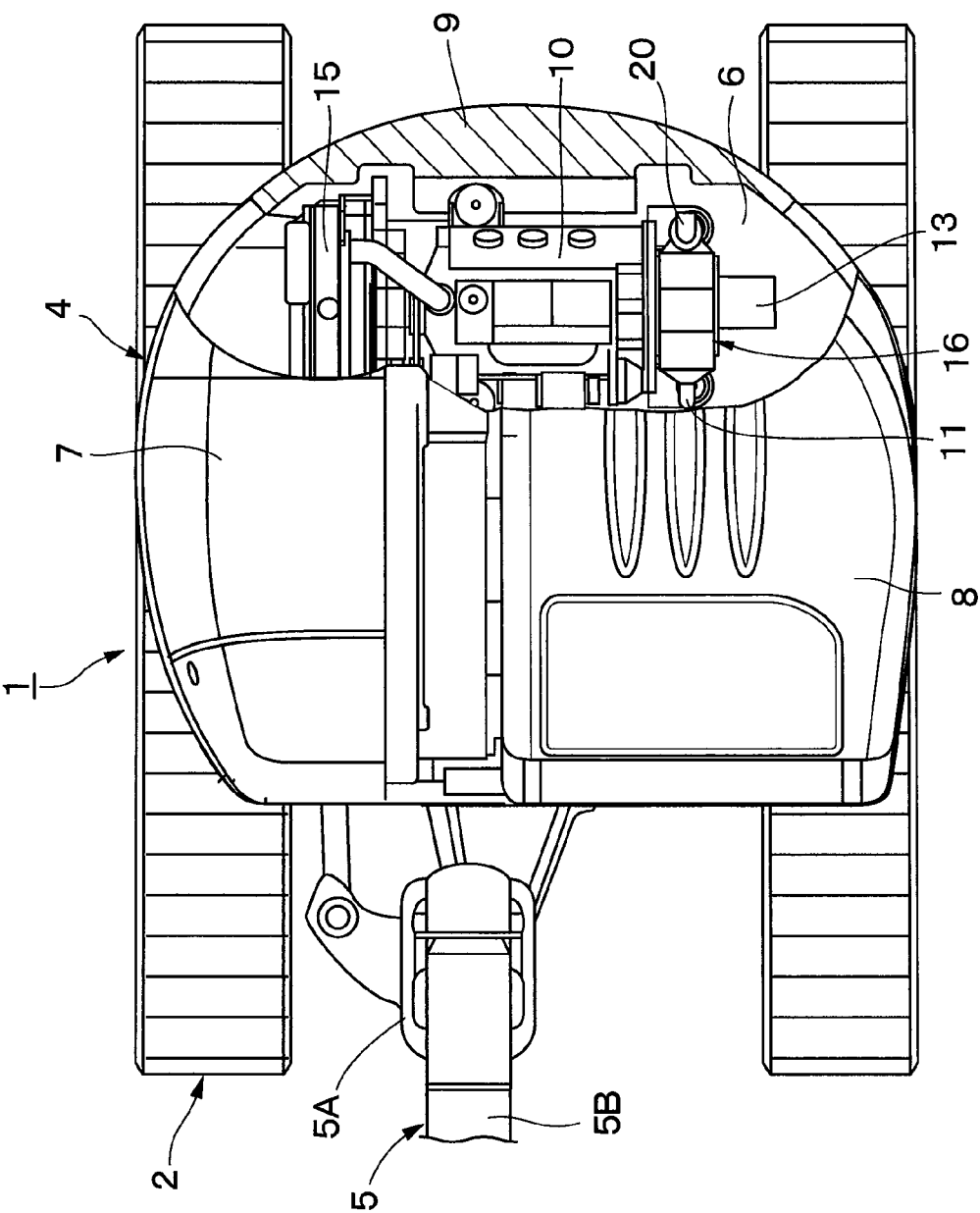
FIG. 2 is a partially cut-away plan view showing the hydraulic excavator in an enlarged scale with a cab and an exterior cover being partially removed from an upper revolving structure in FIG. 1.

The counterweight 9 constitutes a part of the upper revolving structure 4, the counterweight 9 being attached to the rear end of the revolving frame 6 behind the below-described engine 10 so as to balance the weight with the working mechanism 5. As shown in FIG. 2, the rear surface side of the counterweight 9 is arcuate, making small the revolving radius of the upper revolving structure 4.

Designated at 10 is an engine transversely mounted on the rear side of the revolving frame 6, and since the engine 10 is installed in the small-sized hydraulic excavator 1 as a prime mover, as described above, the engine 10 is configured by using a small diesel engine, for example. As shown in FIG. 2, at the left side of the engine 10, an exhaust pipe 11 is provided to constitute apart of an exhaust gas passage, and a below-described exhaust gas purifying device 16 is connected to the exhaust pipe 11.

Figure 3:
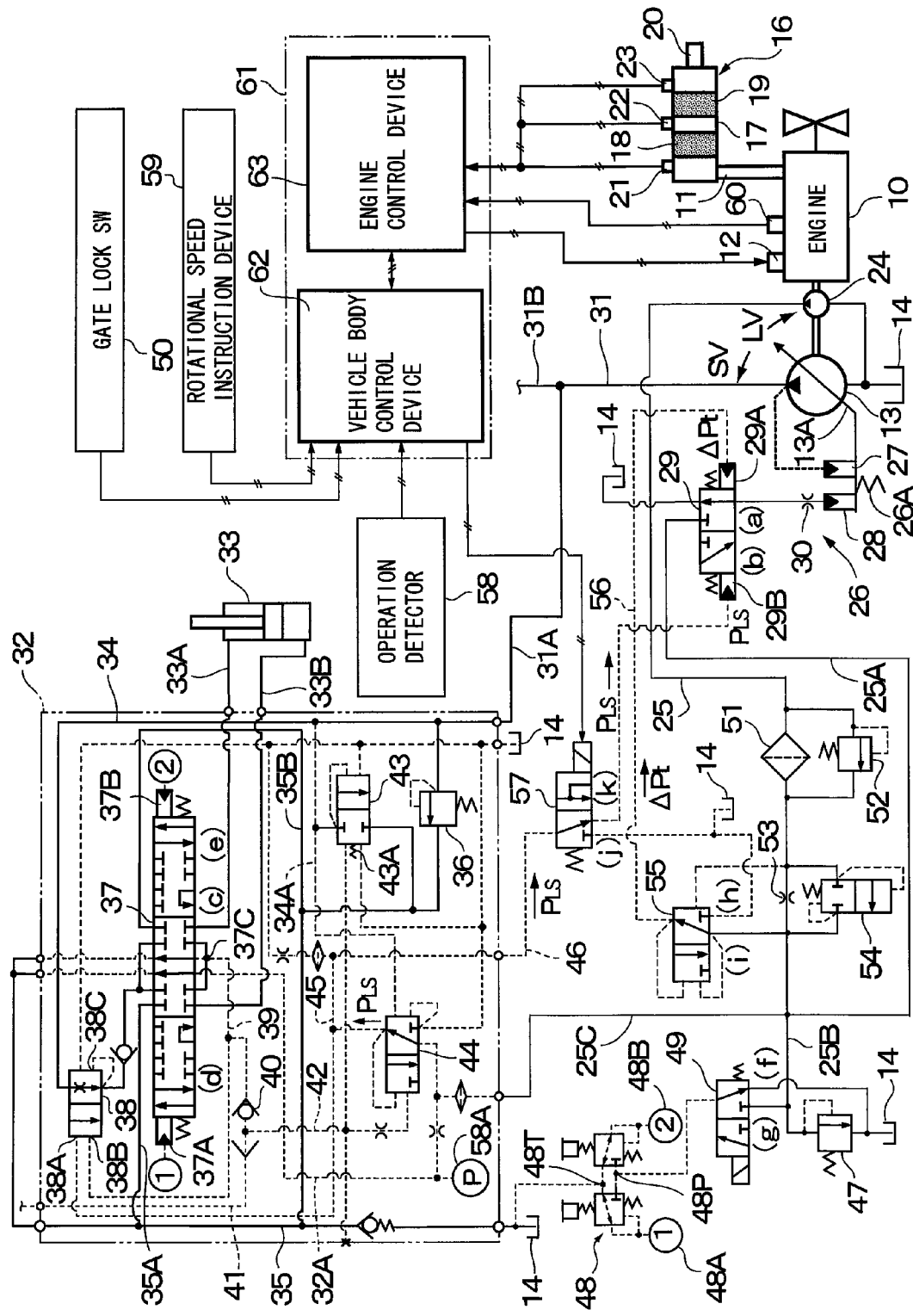
FIG. 3 is an entire configuration diagram showing a load sensing control hydraulic circuit including an engine, a hydraulic pump, a working hydraulic cylinder and an engine control device in a state where the hydraulic cylinder is stationary.

In this case, the engine 10 is composed of an electronically controlled engine, and the fuel supply amount can be variably controlled by an electronic governor 12 (see FIG. 3). Namely, the electronic governor 12 can variably control the injection quantity of fuel to be supplied to the engine 10 in accordance with a control signal outputted from a below-mentioned engine control device 63. Thus, the rotational speed of the engine 10 is controlled to correspond with a target rotational speed according to the control signal.

Designated at 13 is a variable displacement type hydraulic pump disposed at the left side of the engine 10, the hydraulic pump 13 constituting a hydraulic source together with the operating oil tank 14 (hereinafter referred to as tank 14) shown in FIG. 3. The hydraulic pump 13 has a displacement variable portion 13A by which the delivery displacement of the pressurized oil can be varied between a large displacement and a small displacement. Herein, in a case where the hydraulic pump 13 is composed of a variable displacement swash plate type hydraulic pump, for example, the displacement variable portion 13A is composed of a swash plate. In a case where the hydraulic pump 13 is composed of a variable displacement bent axis type hydraulic pump, the displacement variable portion 13A is composed of a bent axis.

The displacement variable portion 13A of the hydraulic pump 13 can be tilted by a below-mentioned returning spring 26A and tilting actuators 27, 28 between a maximum tilting position (large displacement position) and a minimum tilting position (small displacement position). The delivery displacement of the hydraulic pump 13 is maximized as the displacement variable portion 13A is tilted to the maximum tilting position in the direction of the arrow LV in FIG. 3 and minimized as the displacement variable portion 13A is tilted to the minimum tilting position in the direction of the arrow SV. The delivery displacement of the hydraulic pump 13 (the flow rate of the pressurized oil) may be controlled to switch between the maximum displacement and the minimum displacement either continuously or intermittently in a stepwise manner in accordance with the tilting position (i.e., tilting angle) of the displacement variable portion 13A.

As shown in FIG. 2, the hydraulic pump 13 is attached to the left side of the engine 10 through a power transmission device (not shown), and the rotary output of the engine 10 is transmitted through the power transmission device. When rotated by the engine 10, the hydraulic pump 13 sucks in the oil in the tank 14 and delivers the pressurized oil through a below-mentioned delivery line 31 toward a directional control valve 37 in the valve unit 32.

The heat exchanger 15 is disposed on the revolving frame 6 at the right side of the engine 10. The heat exchanger 15 includes a radiator, an oil cooler and an intercooler, for example. Namely, the heat exchanger 15 cools not only the engine 10 but also the pressurized oil (operating oil) to be returned to the tank 14.

Next, an explanation will be made of the exhaust gas purifying device 16 used in the first embodiment.

Namely, designated at 16 is an exhaust gas purifying device capable of removing harmful substances contained in the exhaust gas of the engine 10 for purification, the exhaust gas purifying device 16 being disposed at the left upper part of the engine 10, as shown in FIG. 2. The exhaust pipe 11 of the engine 10 is connected to the upstream side of the exhaust gas purifying device 16. The exhaust gas purifying device 16 constitutes an exhaust gas passage together with the exhaust pipe 11, removing harmful substances contained in the exhaust gas while the exhaust gas is being flowed from the upstream side to the downstream side.

Therefore, the engine 10, which is a diesel engine, is highly efficient and also excellent in durability. However, the exhaust gas of the engine 10 may contain a harmful substance comprising particulate matter (PM), nitrogen oxides ($NO_x$) and carbon monoxide (CO), for example. As a result, the exhaust gas purifying device 16 attached to the exhaust pipe 11 is configured to include a below-mentioned oxidation catalyst 18 for oxidizing and removing the carbon monoxide (CO), and the like, and a below-mentioned particulate matter removing filter 19 for collecting and removing the particulate matter.

As shown in FIG. 3, the exhaust gas purifying device 16 has a tubular casing 17 composed of a plurality of tubes detechably connected in front to rear relation to each other. The oxidation catalyst 18 (generally called "Diesel Oxidation catalyst" or "DOC" for short) and the particulate matter removing filter 19 (generally called "Diesel Particulate Filter" or "DPF" for short) are detechably accommodated in the casing 17.

The oxidation catalyst 18 is formed of a cellular ceramic tube having an outside diameter equal to, for example, an inside diameter of the casing 17, where a large number of through holes (not shown) are formed in its axial direction and its inner surface is coated with a noble metal. When the exhaust gas is passed through the individual through holes at a given temperature, the oxidation catalyst 18 removes carbon monoxide (CO) and hydrocarbon (HC) contained in the exhaust gas by oxidation and also removes nitrogen oxides (NO) by conversion into nitrogen dioxides ($NO_2$).

On the other hand, the particulate matter removing filter 19 is disposed downstream of the oxidation catalyst 18 inside the casing 17. The particulate matter removing filter 19 purifies the exhaust gas not only by collecting the particulate matter in the exhaust gas discharged from the engine 10 but also by burning and removing the collected particulate matter. Therefore, the particulate matter removing filter 19 is formed of a cellular tube that is produced by forming a large number of minute holes (not shown) in a porous member made of, for example, a ceramic material in its axial direction. Thus, the particulate matter removing filter 19 can collect the particulate matter through the large number of minute holes, and the collected particulate matter can be burned and removed as described above. As a result, the particulate matter removing filter 19 can be regenerated.

As shown in FIG. 3, a discharge port 20 of the exhaust gas is provided downstream of the exhaust gas purifying device 16. The discharge port 20 is connected to the outlet side of the casing 17 downstream of the particulate matter removing filter 19. The discharge port 20 includes, for example, a stack for discharging the exhaust gas into the air after purification.

An exhaust gas temperature sensor 21 detects the temperature of the exhaust gas, the exhaust gas temperature sensor 21 constituting a temperature detector. As shown in FIG. 3, the exhaust gas temperature sensor 21 is attached to the casing 17 of the exhaust gas purifying device 16, detecting the temperature of the exhaust gas discharged from the exhaust pipe 11 side. The temperature detected by the exhaust gas temperature sensor 21 is outputted as a detection signal to the below-described engine control device 63.

Indicated at 22, 23 are gas pressure sensors provided on the casing 17 of the exhaust gas purifying device 16, the gas pressure sensors 22, 23 constituting a pressure detector. The gas pressure sensors 22, 23 are arranged apart from each other by sandwiching the particulate matter removing filter 19 therebetween. One gas pressure sensor 22 detects the gas pressure of the exhaust gas, as a pressure P1, at the upstream side (inlet side) of the particulate matter removing filter 19, while the other gas pressure sensor 23 detects the gas pressure of the exhaust gas, as a pressure P2, at the downstream side (outlet side) of the particulate matter removing filter 19. The gas pressure sensors 22, 23 output their detection signals to the below-mentioned engine control device 63. With the detection signals from the gas pressure sensors 22, 23, the engine control device 63 determines whether or not the regeneration of the particulate matter removing filter 19 is necessary based on the rotational speed of the engine (the injection quantity of fuel) and the temperature of the exhaust gas.

From the upstream side pressure P1 detected by the gas pressure sensor 22 and the downstream side pressure P2 detected by the gas pressure sensor 23, the below-mentioned engine control device 63 calculates a pressure difference $\Delta P$ between them (i.e., differential pressure between the front and rear sides of the filter) according to the following formula 1. Furthermore, from the calculation result of the pressure difference $\Delta P$, the engine control device 63 estimates the accumulated amount (i.e., collected amount) of particulate matter or unburnt residue adhered to the particulate matter removing filter 19. In this case, the pressure difference $\Delta P$ is small as long as the collected amount is small, but increases with increase in the collected amount.

$$\Delta P = P1 - P2. \qquad \text{[Formula 1]}$$

Next, an explanation will be made of a pilot pump 24 and a displacement regulator 26 used for controlling the displacement of the hydraulic pump 13.

The pilot pump 24 is an auxiliary hydraulic pump constituting an auxiliary hydraulic source together with the tank 14. As shown in FIG. 3, the pilot pump 24 is rotated by the engine 10 together with the main hydraulic pump 13. The pilot pump 24 generates a below-mentioned pilot pressure by delivering the operating oil sucked in from the tank 14 toward a pilot line 25. The pilot line 25 branches into a plurality of lines: a first pilot line 25A, a second pilot line 25B and a third pilot line 25C at a position downstream of a below-mentioned throttle 53.

Designated at 26 is a displacement regulator for variably controlling the delivery displacement of the pressurized oil by the hydraulic pump 13. The displacement regulator 26 includes the horsepower control tilting actuator 27 and the load sensing control tilting actuator 28 for tilting the displacement variable portion 13A of the hydraulic pump 13, a displacement control valve 29 for load sensing control, and the returning spring 26A for biasing the displacement variable portion 13A of the hydraulic pump 13 toward the maximum tilting position. The horsepower control tilting actuator 27 and the load sensing control tilting actuator 28 are hydraulic cylinders which can tilt the displacement variable portion 13A of the hydraulic pump 13 toward the minimum tilting position against the returning spring 26A. The tilting angle of the displacement variable portion 13A can be variably set in accordance with the pressure of the pressurized oil supplied to or discharged from the hydraulic cylinders of the actuators 27, 28.

Figure 8:
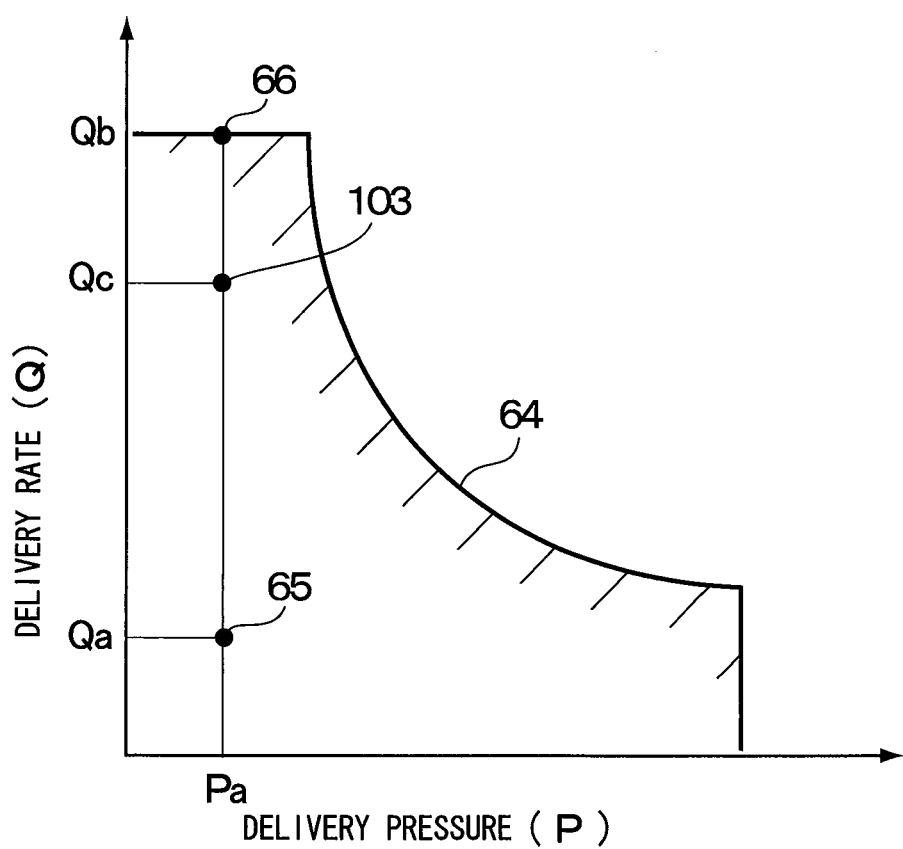
FIG. 8 is a characteristic curve showing a relationship between a delivery pressure and a flow rate of the hydraulic pump by horsepower control.

The horsepower control tilting actuator 27 of the displacement regulator 26 controls a delivery rate Q versus a delivery pressure P of the hydraulic pump 13, for example, along a characteristic curve 64 shown in FIG. 8. More specifically, as the delivery pressure P of the pressurized oil rises, the horsepower control tilting actuator 27 gradually decreases the tilting angle of the displacement variable portion 13A to reduce the delivery rate Q of the hydraulic pump 13. On the other hand, as the delivery pressure P of the pressurized oil drops, the tilting angle of the displacement variable portion 13A has to be gradually increased to increase the delivery rate Q of the pressurized oil to be delivered from the hydraulic pump 13. Therefore, the displacement variable portion 13A of the hydraulic pump 13 is tilted in the direction of the arrow LV by the returning spring 26A.

The displacement control valve 29 is composed of a switching valve having left side and right side hydraulic pilot portions 29A, 29B. The displacement control valve 29 is switched between a large displacement position (a) and a small displacement position (b) depending on pilot pressures (below-mentioned load sensing target differential pressure ΔPt and load sensing control pressure PLS) supplied to the hydraulic pilot portions 29A, 29B. When switched to the large displacement position (a), the displacement control valve 29 allows communication between the load sensing control tilting actuator 28 and the tank 14 through a throttle 30. Thus, the displacement variable portion 13A of the hydraulic pump 13 is tilted by the spring force of the returning spring 26A toward the maximum tilting position in the direction of the arrow LV.

Figure 4:
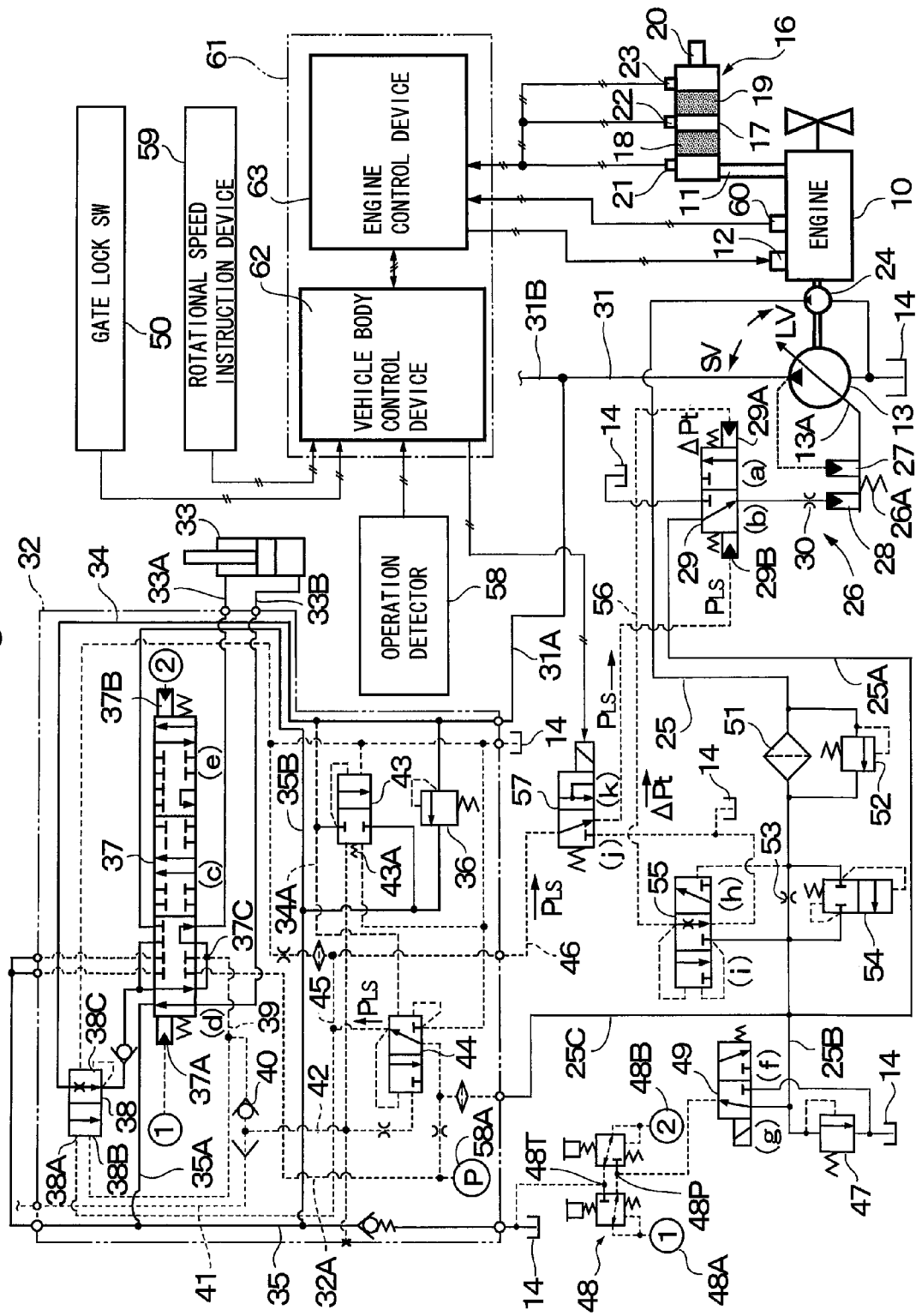
FIG. 4 is an entire configuration diagram showing a state where a directional control valve is switched from a neutral position to a switching position so as to drive the hydraulic cylinder in FIG. 3.
Figure 5:
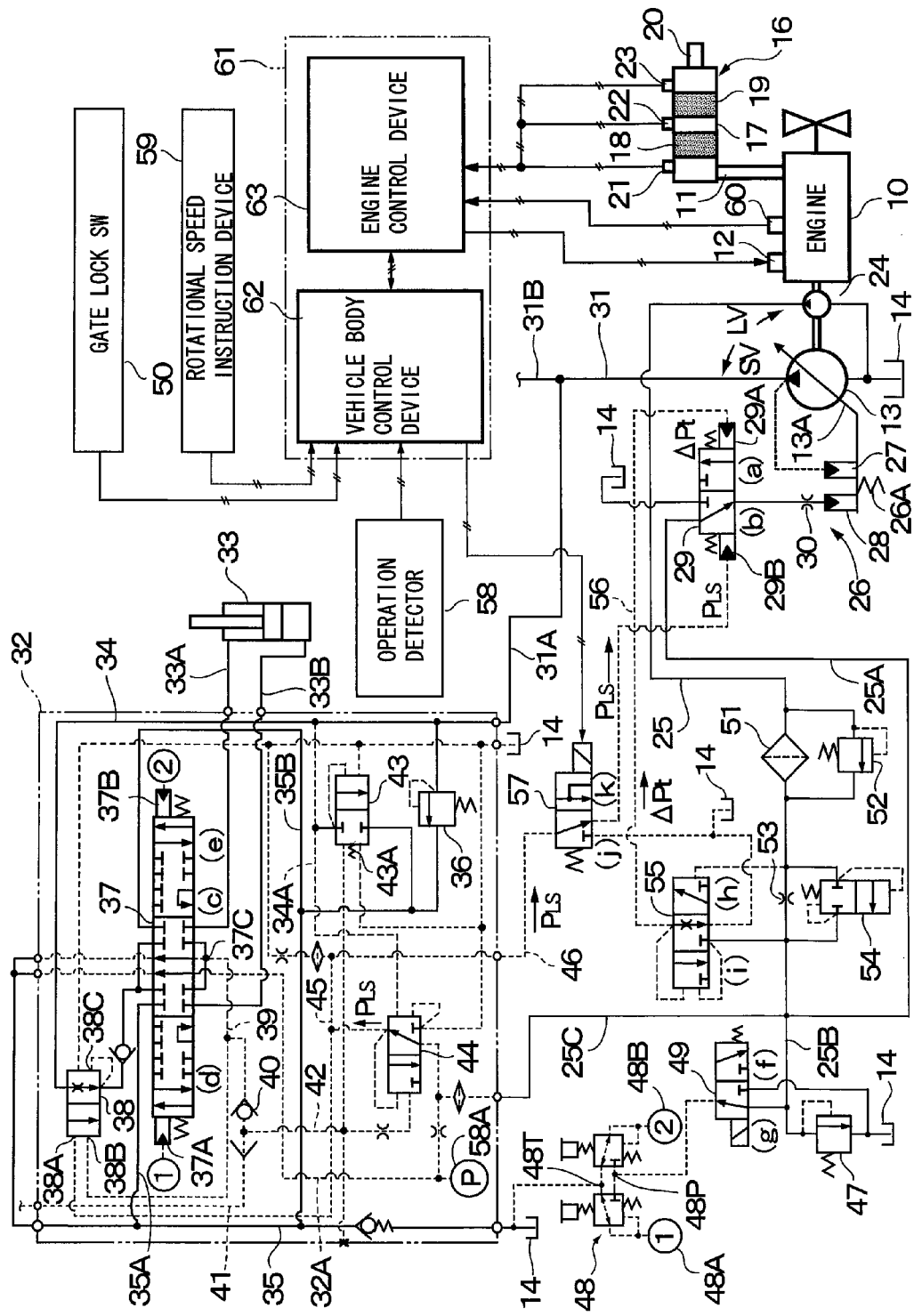
FIG. 5 is an entire configuration diagram showing a state where the displacement of the hydraulic pump is being controlled with the directional control valve in FIG. 4 returned to the neutral position.

On the other hand, as shown in FIGS. 4 and 5, when the displacement control valve 29 is switched from the large displacement position (a) to the small displacement position (b), the pressurized oil (pilot pressure) delivered from the pilot pump 24 into the pilot line 25 is supplied to the load sensing control tilting actuator 28 through the first pilot line 25A, the displacement control valve 29 and the throttle 30. Thus, the load sensing control tilting actuator 28 tilts the displacement variable portion 13A in the direction of the arrow SV against the returning spring 26A to have a smaller tilting angle, thereby reducing the delivery displacement of the hydraulic pump 13.

In this case, the displacement control valve 29 switches from the large displacement position (a) to the small displacement position (b) as the pilot pressure to be supplied to the hydraulic pilot portion 29B (i.e., the below-mentioned load sensing control pressure PLS) becomes higher than the pilot pressure to be supplied to the hydraulic pilot portion 29A (i.e., the below-mentioned load sensing target differential pressure ΔPt). However, the load sensing control pressure PLS relatively decreases with decrease in the flow rate of the pressurized oil delivered from the hydraulic pump 13, as described below. Therefore, the displacement control valve 29 switches from the small displacement position (b) to the large displacement position (a) as the load sensing control pressure PLS becomes lower than the load sensing target differential pressure ΔPt.

On the other hand, when the load sensing control pressure PLS becomes higher than the load sensing target differential pressure Pt owing to increase in the flow rate of the pressurized oil delivered from the hydraulic pump 13, the displacement control valve 29 switches from the large displacement position (a) to the small displacement position (b) again. As described above, the displacement control valve 29 operates to repeatedly switch between the large displacement position (a) and the small displacement position (b) depending on the load sensing control pressure PLS and the load sensing target differential pressure ΔPt. Consequently, the displacement of the hydraulic pump 13 is controlled such that the delivery pressure of the hydraulic pump 13 becomes higher than a below-mentioned maximum load pressure by a target differential pressure.

However, if the relationship between the delivery pressure P and the delivery rate Q of the hydraulic pump 13 exceeds the range of the characteristic curve 64 shown in FIG. 8, the engine 10 may be overloaded to cause engine stall. Therefore, the horsepower control tilting actuator 27 of the displacement regulator 26 tilts the displacement variable portion 13A of the hydraulic pump 13 such that the relationship between the delivery pressure P and the delivery rate Q of the hydraulic pump 13 falls within the range of the characteristic curve 64 shown in FIG. 8.

The delivery line 31 is a line connected to the delivery side of the hydraulic pump 13, the delivery line 31 supplying the pressurized oil delivered from the hydraulic pump 13 to a plurality of hydraulic actuators (for example, including a below-mentioned hydraulic cylinder 33). Therefore, the delivery line 31 branches into a plurality of delivery line parts 31A, 31B, where the delivery line part 31A is connected to a supply line 34 of the below-mentioned valve unit 32. On the other hand, the other delivery line part 31B supplies the pressurized oil to other hydraulic actuators than the hydraulic cylinder 33 through other valve units (none of which are shown).

It should be noted that, in addition to the boom cylinder 5E, the arm cylinder 5F and the bucket cylinder 5G shown in FIG. 1 and the swing cylinder (not shown), the hydraulic excavator 1 is also equipped with hydraulic actuators such as a hydraulic motor for driving, a hydraulic motor for revolving, and a blade lifting cylinder (none of which are shown). However, in the hydraulic circuit shown in FIG. 3, the hydraulic cylinder 33 is shown as a representative of such hydraulic actuators for the sake of simplifying the explanation.

Next, an explanation will be made of the valve unit 32 which is configured to include the directional control valve 37, a pressure compensating valve 38 and a pressure control valve 44.

Designated at 32 is a valve unit for controlling the operation of the hydraulic cylinder 33. The valve unit 32 is provided with the pressurized oil supply line 34 connected to the delivery line part 31A of the delivery line 31, a discharge line 35 connected to the tank 14, the directional control valve 37, the pressure compensating valve 38, load pressure lead-out lines 39, 41, a shuttle valve 40, a maximum load pressure line 42, a signal pressure lead-out line 45, and the like, which will be described later. The valve unit 32 is also provided with a high pressure relief valve 36 which defines the maximum pressure in the delivery line 31 and relieves the excess pressure to the discharge line 35 side, an unload valve 43, and the pressure control valve 44, which will be described later. Moreover, in the valve unit 32, there is formed a detecting line 32A which detects whether or not the directional control valve 37 is in a neutral position (c) by a below-mentioned pressure sensor 58A.

The supply line 34 connected to the hydraulic pump 13 is bifurcated at its midway position to have a pressure lead-out line 34A. The pressure lead-out line 34A supplies a switching control pressure as a pilot pressure to the below-mentioned unload valve 43 and the pressure control valve 44. The discharge line 35 has two line parts 35A, 35B, for example. When the below-mentioned directional control valve 37 is switched from the neutral position (c) to either a left side switching position (d) or a right side switching position (e), the line parts 35A, 35B allow the return oil discharged from main lines 33A, 33B of the hydraulic cylinder 33 to be discharged into the tank 14. Moreover, the high pressure relief valve 36 is disposed between the pressurized oil supply line 34 and the line part 35B of the discharge line 35, setting the upper limit of the delivery pressure of the hydraulic pump 13 at a high value.

Indicated at 37 is a directional control valve for controlling the movement of the hydraulic cylinder 33. The directional control valve 37 controls the hydraulic cylinder 33 to expand, contract or stop by selectively allowing the supply line 34 and the discharge line 35 of the valve unit 32 to communicate with a pair of the main lines 33A, 33B of the hydraulic cylinder 33 or shutting off the communication. The directional control valve 37 has left side and right side hydraulic pilot portions 37A, 37B and is switched from the neutral position (c) to either the left side switching position (d) or the right side switching position (e) depending on the pilot pressures supplied from the below-mentioned pilot valve 48 to the hydraulic pilot portions 37A, 37B.

Then, the directional control valve 37 controls the flow rate of the pressurized oil to be supplied from the hydraulic pump 13 to the hydraulic cylinder 33 through the delivery line part 31A of the delivery line 31 and the supply line 34, varying the contraction and expansion speed of the hydraulic cylinder 33 in accordance with the flow rate. The directional control valve 37 has a load port 37C connected to a pressure receiving portion 38B of the below-mentioned pressure compensating valve 38 through the load pressure lead-out line 39. When the directional control valve 37 is switched from the neutral position (c) to either the switching position (d) or the switching position (e), the load port 37C is connected to the higher pressure one of the main lines 33A, 33B. Therefore, to the pressure receiving portion 38B of the pressure compensating valve 38, the load pressure of the hydraulic cylinder 33, i.e., the downstream side pressure of a meter-in throttle of the directional control valve 37 is led through the below-mentioned load pressure lead-out line 39.

Indicated at 38 is a pressure compensating valve disposed upstream of the directional control valve 37 in the supply line 34. During a combined operation of a plurality of hydraulic actuators, the pressure compensating valve 38 compensates the pressure of the pressurized oil to be supplied to the hydraulic cylinder 33. Therefore, the pressure compensating valve 38 has pressure receiving portions 38A, 38B that can operate in an open direction and a pressure receiving portion 38C that can operate in a closing direction. Among the pressure receiving portions 38A to 38C, the output pressure of the pressure control valve 44 is led to the pressure receiving portion 38A, where the output pressure is a pressure corresponding to the below-mentioned load sensing control pressure PLS, which is generally called a load sensing differential pressure. The load pressure of the hydraulic cylinder 33 (the downstream side pressure of the meter-in throttle of the directional control valve 37) is led through the load port 37C of the directional control valve 37 and the load pressure lead-out line 39 to the pressure receiving portion 38B of the pressure compensating valve 38. To the pressure receiving portion 38C, the upstream side pressure of the meter-in throttle of the directional control valve 37 is led.

Thus, the pressure compensating valve 38 takes the output pressure of the pressure control valve 44 led to the pressure receiving portion 38A as a target compensating differential pressure and equalizes the differential pressure between the front and rear sides of the directional control valve 37 with the target compensating differential pressure (i.e., the load sensing control pressure PLS). Namely, the pressure compensating valve 38 is switching-controlled such that the upstream side pressure of the meter-in throttle of the directional control valve 37 to be supplied to the pressure receiving portion 38C becomes higher than the load pressure of the hydraulic cylinder 33 (the downstream side pressure of the meter-in throttle) to be supplied to the pressure receiving portion 38B through the load pressure lead-out line 39 by the load sensing control pressure PLS.

With the pressure compensating valve 38 thus constructed, during a combined operation where a plurality of hydraulic actuators (including the hydraulic cylinder 33) are simultaneously driven, the directional control valve 37 and directional control valves in other valve units (not shown) can supply the pressurized oil to their respective hydraulic actuators at a ratio corresponding to the opening areas of the meter-in throttles regardless of the magnitude of their respective load pressures. Further, during such a combined operation, there may occur a saturation state where the flow rate of the pressurized oil delivered from the hydraulic pump 13 is less than the flow rate demanded by the directional control valve 37 and the other directional control valves. However, even in this case, the load sensing control pressure PLS (load sensing differential pressure) decreases in accordance with the degree of saturation, and the target compensating differential pressure of the pressure compensating valve 38 also decreases correspondingly. Therefore, the pressurized oil delivered from the hydraulic pump 13 can be distributed at a ratio of flow rates demanded by the respective hydraulic actuators (including the hydraulic cylinder 33).

Indicated at 40 is a shuttle valve constituting a part of a maximum load pressure detection circuit. The shuttle valve 40 is disposed between the load pressure lead-out line 41 along which load pressures of other hydraulic actuators (not shown) are led and the load pressure lead-out line 39 connected to the load port 37C of the directional control valve 37. The shuttle valve 40 selects the pressure in the higher pressure one of the load pressure lead-out lines 39, 41 and leads the selected higher pressure to the maximum load pressure line 42. Thus, the highest load pressure (maximum load pressure) among those of the hydraulic actuators is led to the maximum load pressure line 42 as a signal pressure.

Indicated at 43 is an unload valve disposed in the valve unit 32. The unload valve 43 is connected so as to be in parallel with the high pressure relief valve 36 between the pressure lead-out line 34A branching from the pressurized oil supply line 34 and the discharge line 35. The unload valve 43 is always biased in a valve closing direction by a pressure setting spring 43A disposed at one end. The unload valve 43 receives at one end the pilot pressure from the maximum load pressure line 42 (the maximum load pressure) and receives at the other end the pilot pressure from the pressure lead-out line 34A (the delivery pressure of the hydraulic pump 13).

Thus, the unload valve 43 controls the delivery pressure of the hydraulic pump 13 (the pressure in the pressure lead-out line 34A) to be higher than the maximum load pressure of the maximum load pressure line 42 by a prescribed pressure (i.e., the set pressure of the spring 43A), and if the differential pressure between them exceeds the prescribed pressure, the valve is opened to allow communication between the pressure lead-out line 34A and the line part 35B of the discharge line 35. As a result, for energy savings, the unload valve 43 can prevent the delivery pressure of the hydraulic pump 13 from excessively exceeding the maximum load pressure of the maximum load pressure line 42, reducing the delivery pressure of the pump during unload operation to a pressure corresponding to the prescribed pressure (the set pressure of the spring 43A), for example.

Designated at 44 is a pressure control valve disposed in the valve unit 32. The pressure control valve 44 reduces the pressure of the pressurized oil supplied from the pilot pump 24 to the third pilot line 25C of the pilot line 25 as the load sensing control pressure PLS and outputs the load sensing control pressure PLS to the signal pressure lead-out line 45. The pressure control valve 44 receives at one end the pilot pressure from the maximum load pressure line 42 (the maximum load pressure) and the pressure in the signal pressure lead-out line 45 (the load sensing control pressure PLS) and receives at the other end the pilot pressure from the pressure lead-out line 34A (the delivery pressure of the hydraulic pump 13).

The pressure control valve 44 reduces the pressure of the pressurized oil supplied from the pilot pump 24 to the third pilot line 25C of the pilot line 25 (the pilot pressure) by a balance between the pressures thus received at both ends, outputting to the signal pressure lead-out line 45 a pressure equal to a differential pressure between the pressure of the pressurized oil supply line 34 and the pressure of the maximum load pressure line 42 (i.e., the load sensing control pressure PLS). In other words, the pressure control valve 44 constitutes a differential pressure generating valve which outputs the load sensing control pressure PLS, which is a differential pressure between the pressure of the supply line 34 (the delivery pressure of the hydraulic pump 13) and the maximum load pressure of the maximum load pressure line 42, as an absolute pressure.

The output pressure of the pressure control valve 44 (i.e., the load sensing control pressure PLS) is led to the hydraulic pilot portion 29B of the displacement control valve 29 through the signal pressure lead-out line 45 and a signal pressure line 46 as well as to the pressure receiving portion 38A of the pressure compensating valve 38. The signal pressure line 46 is a line through which the signal pressure lead-out line 45 formed in the valve unit 32 is connected to the hydraulic pilot portion 29B of the outside displacement control valve 29. The pressure control valve 44 outputs the load sensing control pressure PLS to the hydraulic pilot portion 29B of the displacement control valve 29 through the signal pressure lead-out line 45 and the signal pressure line 46 such that the delivery pressure of the hydraulic pump 13 becomes higher than the maximum load pressure by a target differential pressure.

Next, an explanation will be made of a low pressure relief valve 47 associated with the pilot pump 24, the pilot valve 48, the gate lock valve 49, a gate lock switch 50, and the like.

Indicated at 47 is a low pressure relief valve for controlling the delivery pressure of the pilot pump 24, the low pressure relief valve 47 being provided between the second pilot line 25B of the pilot line 25 and the tank 14. The low pressure relief valve 47 defines the maximum pressure of the pressurized oil delivered from the pilot pump 24 (pilot pressure), and if the pressure in the second pilot line 25B becomes excess pressure higher than the maximum pressure, the low pressure relief valve 47 is opened to relieve the excess pressure to the tank 14 side.

Indicated at 48 is a pressure reducing valve type pilot operating valve for controlling the hydraulic cylinder 33 remotely (hereinafter referred to as pilot valve 48). The pilot valve 48 is disposed in the cab 8 of the hydraulic excavator 1, for example, having an operating lever (not shown) to be tilted by an operator. The pilot valve 48 has a pump port 48P connected to the second pilot line 25B (i.e., the pilot pump 24) through the below-mentioned gate lock valve 49, while a tank port 48T is connected to the tank 14.

Output ports 48A, 48B of the pilot valve 48 are connected to the hydraulic pilot portions 37A, 37B of the directional control valve 37 through a pair of pilot lines (not shown). When the operating lever is tilted by an operator with the below-mentioned gate lock valve 49 switched from a lock position (f) to an operating position (g), the output ports 48A, 48B of the pilot valve 48 supply pilot pressures corresponding to the operation to the respective hydraulic pilot portions 37A, 37B of the directional control valve 37. Thus, the directional control valve 37 is switched from the neutral position (c) shown in FIGS. 3 and 4 to either the switching position (d) or the switching position (e).

Indicated at 49 is a gate lock valve to be switched manually by an operator, the gate lock valve 49 being switched in conjunction with the gate lock lever (not shown) disposed in the cab 8 of the hydraulic excavator 1. Namely, until an operator sits on the operator's seat in the cab 8, the gate lock valve 49 is held in the lock position (f) as the gate lock lever is in an upwardly tilted position. However, when the operator manually tilts the gate lock lever downward after sitting on the seat, the gate lock valve 49 is excited and switched from the lock position (f) to the operating position (g).

As shown in FIG. 3, when the gate lock valve 49 is in the lock position (f), the pump port 48P of the pilot valve 48 is connected to the tank 14, so that the pump port 48P is kept in a tank pressure (low pressure) state. Therefore, even if the operating lever of the pilot valve 48 is tilted, the pilot pressure is not supplied to the output ports 48A, 48B, so that the directional control valve 37 is maintained in the neutral position (c).

On the other hand, as shown in FIG. 4, the gate lock valve 49 is switched from the lock position (f) to the operating position (g) by the tilting operation of the gate lock lever. At this time, the pump port 48P of the pilot valve 48 is connected to the pilot pump 24 through the second pilot line 25B, so that the pilot pressure set by the low pressure relief valve 47 is supplied to the pump port 48P, for example. Therefore, when the operating lever is tilted, the pilot valve 48 can supply the pilot pressure from the output ports 48A, 48B side to the hydraulic pilot portions 37A, 37B of the directional control valve 37, thereby switching the directional control valve 37 from the neutral position (c) to either the switching position (d) or the switching position (e).

Indicated at 50 is a gate lock switch connected to a below-mentioned controller 61, and when the gate lock lever is manually operated by an operator in the cab 8, the gate lock switch 50 is opened or closed in conjunction therewith. That is, as long as the gate lock valve 49 is in the lock position (f) with the gate lock lever tilted upward by an operator, the gate lock switch 50 is opened. On the other hand, when the gate lock valve 49 is switched from the lock position (f) to the operating position (g) by tilting the gate lock lever downward, the gate lock switch 50 is closed.

Thus, the gate lock switch 50 constitutes an operation lock detector, outputting a detection signal for determining whether the hydraulic excavator 1 is in an operable state or in an operation lock state to the below-mentioned controller 61. Namely, as long as the gate lock valve 49 is in the lock position (f), the controller 61 determines that the hydraulic excavator 1 is operationally locked and kept in an immobilized state. On the other hand, when the gate lock valve 49 is switched from the lock position (f) to the operating position (g), the controller 61 determines that the hydraulic excavator 1 is in an operable state and performs the process shown in FIG. 7.

Next, an explanation will be made of a pressure generating valve 55 for generating the load sensing target differential pressure ΔPt, as well as the throttle 53, a flow rate adjusting valve 54, and the like associated therewith.

Indicated at 51 is a filter disposed along the pilot line 25. The filter 51 removes foreign matter from the pressurized oil (pilot pressure) flowing from the pilot pump 24 toward the low pressure relief valve 47 and the tank 14, purifying the flowing oil. In addition, along the pilot line 25, a relief valve 52 is disposed in parallel with the filter 51. When the filter 51 gets clogged, for example, the relief valve 52 is opened to allow the oil to pass around the filter 51.

Indicated at 53 is a throttle disposed along the pilot line 25 at a position downstream of the filter 51. The throttle 53 provides a throttling action to the oil flowing in the pilot line 25 from the pilot pump 24 toward the low pressure relief valve 47 and the tank 14, generating a differential pressure across the throttle 53. The differential pressure is inputted to the pressure generating valve 55 and used as the load sensing target differential pressure ΔPt.

Here, the flow rate of the oil flowing in the pilot line 25 is a delivery rate of the pilot pump 24, and the delivery rate varies with the rotational speed of the engine 10. Therefore, the differential pressure generating between the front and rear sides of the throttle 53 (i.e., the differential pressure to be used as the load sensing target differential pressure ΔPt) increases or decreases with the rotational speed of the engine 10. Thus, for example, the load sensing target differential pressure ΔPt decreases with decrease in the rotational speed of the engine 10, while the load sensing target differential pressure ΔPt increases with increase in the rotational speed of the engine.

The flow rate adjusting valve 54 is disposed along the pilot line 25 in parallel with the throttle 53. The flow rate adjusting valve 54 opens as the differential pressure between the front and rear sides of the throttle 53 become excessive with the rotational speed of the engine 10 approaching the maximum rotational speed, allowing the oil to pass around the throttle 53. That is, the flow rate adjusting valve 54 opens as the load sensing target differential pressure ΔPt increases more than necessary. Thus, the flow rate adjusting valve 54 can prevent generation of an excessively large flow passage resistance by the throttle 53 against the oil flowing through the pilot line 25.

Indicated at 55 is a pressure generating valve for generating the load sensing target differential pressure ΔPt. The pressure generating valve 55 outputs the load sensing target differential pressure ΔPt generated by using the throttle 53 to a pilot line 56. Therefore, the pressure generating valve 55 receives at one end the downstream side pressure of the throttle 53 and the load sensing target differential pressure ΔPt in the pilot line 56 and receives at the other end the upstream side pressure of the throttle 53.

The pressure generating valve 55 operates to frequently switch between a pressure increase position (h) and a pressure-reducing position (i) by a balance between the pressures thus received at both ends. Consequently, the pressure generating valve 55 reduces the pressure of the pressurized oil (pilot pressure) supplied from the pilot pump 24 to the pilot line 25 (i.e., to the part downstream of the throttle 53), outputting the load sensing target differential pressure ΔPt, which increases or decreases depending on the rotational speed of the engine, to the pilot line 56.

Here, FIGS. 4 and 5 show a state where the pressure generating valve 55 is switched to an intermediate region between the pressure increase position (h) and the pressure-reducing position (i) in order to visualize the state where the load sensing target differential pressure Δpt, which increases or decreases depending on the rotational speed of the engine, is being outputted from the pressure generating valve 55 to the pilot line 56. In this case, when the load sensing target differential pressure ΔPt in the pilot line 56 becomes lower than the differential pressure between the front and rear sides of the throttle 53, the pressure generating valve 55 is switched to the pressure increase position (h), as shown in FIG. 3, and on the other hand, when the load sensing target differential pressure Δpt in the pilot line 56 becomes higher than the differential pressure between the front and rear sides of the throttle 53, the pressure generating valve 55 is switched to the intermediate region between the pressure increase position (h) and the pressure-reducing position (i), as shown in FIGS. 4 and 5.

The pilot line 56 supplies the load sensing target differential pressure ΔPt outputted from the pressure generating valve 55, which increases or decreases depending on the rotational speed of the engine, to the hydraulic pilot portion 29A of the displacement control valve 29. The displacement control valve 29 operates to frequently switch between the large displacement position (a) and the small displacement position (b) depending on the load sensing control pressure PLS supplied to the hydraulic pilot portion 29B and the load sensing target differential pressure ΔPt supplied to the hydraulic pilot portion 29A. Consequently, the displacement control valve 29 controls the displacement of the hydraulic pump 13 such that the delivery pressure of the hydraulic pump 13 becomes higher than the maximum load pressure by a target differential pressure.

Designated at 57 is a control pressure switching valve disposed between the hydraulic pilot portion 29B of the displacement control valve 29 and the pressure control valve 44, the control pressure switching valve 57 being composed of a solenoid valve. The control pressure switching valve 57 is disposed along the signal pressure line 46 and switched by a control signal from the below-mentioned controller 61 to either a load sensing control position (j), which is a control position, or a load sensing control release position (k), which is a control release position. Namely, the control pressure switching valve 57 is held in the load sensing control position (j) while being demagnetized by the control signal from the controller 61 but switched to the load sensing control release position (k) when excited.

Figure 6:
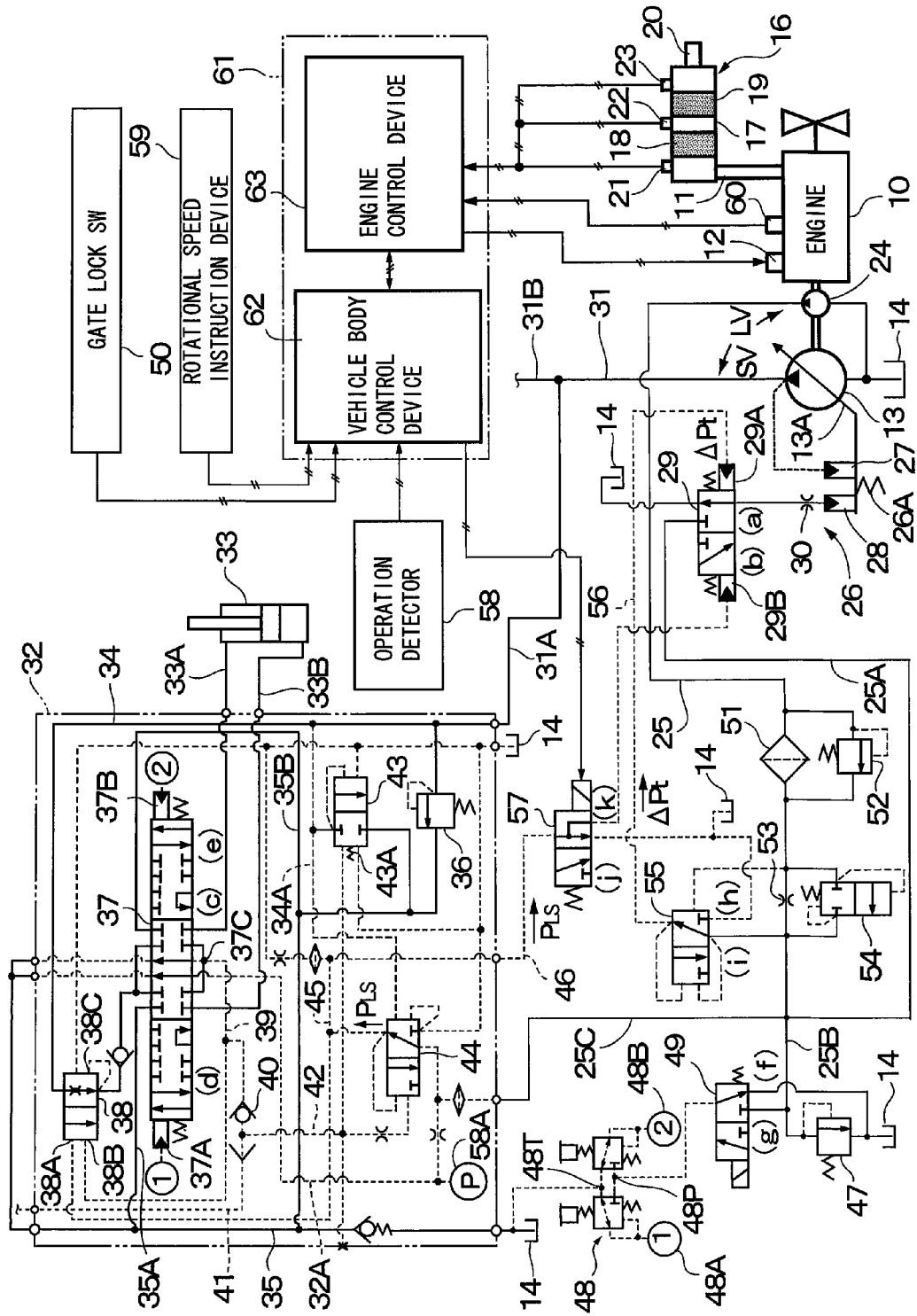
FIG. 6 is an entire configuration diagram showing a state where a displacement control valve is returned to a large displacement position by switching of a control pressure switching valve in FIG. 4.

As long as the control pressure switching valve 57 is being held in the load sensing control position (j), the output pressure of the pressure control valve 44 (i.e., the load sensing control pressure PLS) is supplied to the hydraulic pilot portion 29B of the displacement control valve 29 through the signal pressure lead-out line 45 and the signal pressure line 46. However, as shown in FIG. 6, when the control pressure switching valve 57 is switched from the load sensing control position (j) to the load sensing control release position (k), the signal pressure line 46 is connected to the tank 14, so that the load sensing control pressure PLS is reduced to a prescribed low pressure value (i.e., tank pressure), whereby the hydraulic pilot portion 29B has the tank pressure.

Consequently, the displacement control valve 29 of the displacement regulator 26 is switched from the small displacement position (b) to the large displacement position (a) by the load sensing target differential pressure ΔPt supplied from the pilot line 56 to the hydraulic pilot portion 29A, so that the displacement variable portion 13A of the hydraulic pump 13 is tilted in the direction of the arrow LV. This results in increasing the delivery displacement of the hydraulic pump 13, thereby increasing the rotational load of the engine 10, so that the temperature of the exhaust gas discharged from the engine 10 can be raised to a temperature required for the regeneration process of the particulate matter removing filter 19, as described below.

Next, an explanation will be made of the controller 61, as well as an operation detector 58, a rotational speed instruction device 59, and the like associated therewith.

Figure 9:
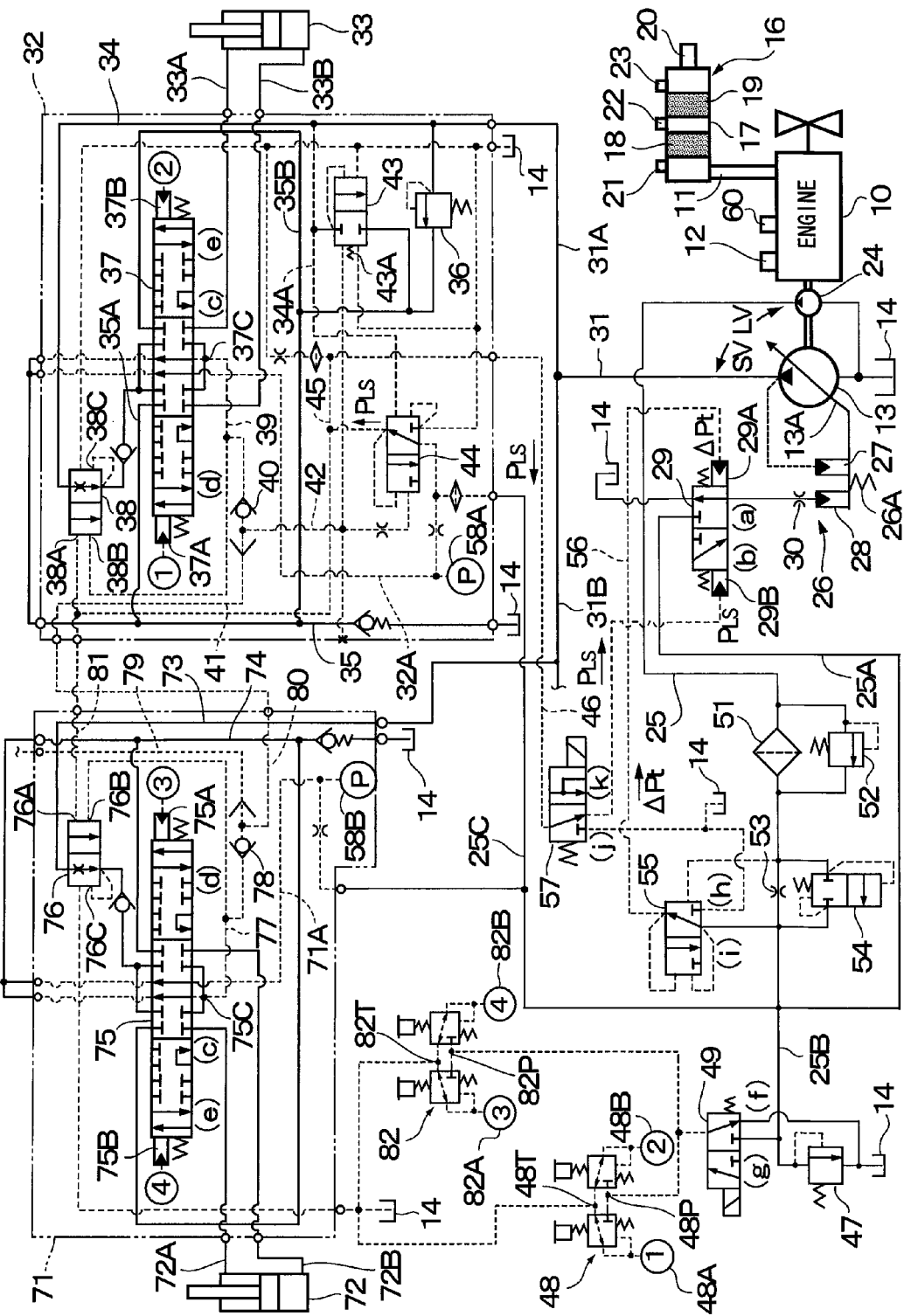
FIG. 9 is a circuit configuration diagram showing a load sensing control hydraulic circuit according to a modification.

Indicated at 58 is an operation detector for detecting whether or not a plurality of hydraulic actuators are stationary, the operation detector 58 including, for example, the pressure sensor 58A disposed in the valve unit 32 and pressure sensors similarly disposed in other valve units (for example, including a pressure sensor 58B shown in FIG. 9). The pressure sensor 58A detects the pressure in the detecting line 32A disposed in the valve unit 32. As shown in FIG. 3, when the directional control valve 37 is in the neutral position (c), the detecting line 32A communicates with the discharge line 35 and the tank 14, so that the pressure to be detected by the pressure sensor 58A drops to the tank pressure. Therefore, the pressure sensor 58A can detect that the directional control valve 37 is in the neutral position (c), and thus the hydraulic cylinder 33 is stationary.

On the other hand, as shown in FIG. 4, when the directional control valve 37 is switched from the neutral position (c) to the switching position (d), the detecting line 32A is cut off from the discharge line 35, so that the pressurized oil from the pilot pump 24 is supplied to the detecting line 32A through the third pilot line 25C of the pilot line 25. Therefore, the pressure sensor 58A detects that the pressure in the detecting line 32A is higher than the tank pressure. Thus, the pressure sensor 58A can detect that the directional control valve 37 is switched from the neutral position (c) to the switching position (d) and the hydraulic cylinder 33 is operating in the contraction direction. It should be noted that also when the directional control valve 37 is switched from the neutral position (c) to the switching position (e), the pressure sensor 58A can similarly detect that the hydraulic cylinder 33 is operating in the expansion direction.

In addition, other valve units (not shown) than the valve unit 32 may be provided with similar pressure sensors (for example, including the pressure sensor 58B shown in FIG. 9) so as to detect whether or not their respective directional control valves are in a neutral position. The operation detector 58 makes it possible for the below-mentioned controller 61 to determine whether or not all hydraulic actuators (for example, including the hydraulic cylinders 33, 72 shown in FIG. 9) are in a stationary, non-operation state (i.e., unload state) in accordance with signals outputted from the pressure sensors (including the pressure sensors 58A, 58B).

The rotational speed instruction device 59 is a device for instructing a target rotational speed of the engine 10, the rotational speed instruction device 59 being disposed in the cab 8 of the upper revolving structure 4 (see FIG. 1) and constituted by an operation dial, an up/down switch or an engine lever to be operated by an operator (none of which are shown). The rotational speed instruction device 59 outputs an instruction signal of the target rotational speed, which is determined based on the operation by the operator, to a below-mentioned vehicle body control device 62.

A rotational sensor 60 is attached to the engine 10 for detecting the rotational speed of the engine 10. The rotational sensor 60 detects the rotational speed of the engine and outputs its detection signal to the below-mentioned engine control device 63. The engine control device 63 monitors the actual rotational speed of the engine 10 based on the detection signal of the rotational speed of the engine and controls the rotational speed of the engine, for example, such that the actual rotational speed approaches the target rotational speed instructed by the rotational speed instruction device 59.

Designated at 61 is a controller constituting a control device of the hydraulic excavator 1, the controller 61 including the vehicle body control device 62 and the engine control device 63, as shown in FIG. 3. The input side of the vehicle body control device 62 is connected to the gate lock switch 50, the operation detector 58, the rotational speed instruction device 59 and an auto-idle selection switch (not shown), while the output side is connected to the gate lock valve 49 and the control pressure switching valve 57.

The vehicle body control device 62 has a memory unit (not shown) including a ROM, a RAM, a non-volatile memory, and the like. The memory unit stores a below-mentioned switching-control process of the control pressure switching valve 57 shown in FIG. 7, i.e., a processing program for switching the control pressure switching valve 57 so as to regenerate the particulate matter removing filter 19 of the exhaust gas purifying device 16. Further, the vehicle body control device 62 also has a function of outputting an instruction signal for instructing the engine control device 63 of the target rotational speed of the engine 10 based on the signal outputted from the rotational speed instruction device 59.

The input side of the engine control device 63 is connected to the exhaust gas temperature sensor 21, the gas pressure sensors 22, 23, the rotational sensor 60 and the vehicle body control device 62, while the output side is connected to the electronic governor 12 of the engine 10 and the vehicle body control device 62. Moreover, the engine control device 63 has a memory unit (not shown) including a ROM, a RAM, a non-volatile memory, and the like. The memory unit stores a processing program for controlling the rotational speed of the engine.

In this case, the engine control device 63 performs a predetermined calculation process based on the instruction signal outputted from the vehicle body control device 62 and the detection signal of the rotational speed of the engine outputted from the rotational sensor 60 and outputs a control signal for instructing a target fuel injection quantity to the electronic governor 12 of the engine 10. The electronic governor 12 of the engine 10 increases or decreases the injection quantity of fuel to be injected and supplied into a combustion chamber (not shown) of the engine 10 or stops the fuel injection in accordance with the control signal. Consequently, the rotational speed of the engine 10 is controlled to correspond with the target rotational speed instructed by the instruction signal from the vehicle body control device 62.

FIG. 8 shows horsepower control characteristics (P-Q characteristics) as the hydraulic pump 13 is being rotated by the engine 10 of the hydraulic excavator 1. Therefore, during the operation (for example, excavating operation) of the hydraulic excavator 1, the hydraulic pump 13 is driven within the range of the characteristic curve 64 of the delivery pressure P and the delivery rate Q shown in FIG. 8. The horsepower control tilting actuator 27 of the displacement regulator 26 tilts the displacement variable portion 13A of the hydraulic pump 13 such that the relationship between the delivery pressure P and the delivery rate Q of the pressurized oil delivered from the hydraulic pump 13 falls within the range of the characteristic curve 64 shown in FIG. 8. This prevents overloading of the engine 10, thereby preventing the occurrence of engine stall.

The hydraulic excavator 1 according to the first embodiment has the above-described configuration, and its operation will be described below.

First of all, an operator of the hydraulic excavator 1 gets into the cab 8 of the upper revolving structure 4 and starts the engine 10 to drive the hydraulic pump 13 and the pilot pump 24. At this time, until the operator sitting on the operator's seat in the cab 8 downwardly tilts the gate lock lever provided in the cab 8, the gate lock valve 49 is held in the lock position (f) in accordance with an operation lock detection signal outputted from the gate lock switch 50.

Therefore, the pilot valve 48 shown in FIG. 3 is held in a tank pressure state with the pump port 48P being connected to the tank 14 through the gate lock valve 49. Consequently, even if the operating lever of the pilot valve 48 is tilted, the pilot pressure is not supplied to the output ports 48A, 48B so that the directional control valve 37 is held in the neutral position (c).

However, once the operator sitting on the operator's seat manually tilts the gate lock lever downwardly, the gate lock switch 50 outputs an operability detection signal, whereby the gate lock valve 49 is excited and switched from the lock position (f) to the operating position (g). As shown in FIGS. 4 and 5, when the gate lock valve 49 is switched to the operating position (g), the pilot pressure set by the low pressure relief valve 47 is supplied to the pump port 48P of the pilot valve 48.

Therefore, when the operating lever of the pilot valve 48 is manually operated by the operator, the pilot pressure can be supplied to the hydraulic pilot portions 37A, 37B of the directional control valve 37 from the output ports 48A, 48B of the pilot valve 48, so that the directional control valve 37 can be switched from the neutral position (c) to either the switching position (d) or the switching position (e). Then, the pressurized oil from the hydraulic pump 13 is supplied to the hydraulic cylinder 33 through the directional control valve 37, whereby the hydraulic cylinder 33 is driven to expand or contract. Consequently, the excavating operation of earth and sand can be performed, for example, by elevating the working mechanism 5 of the hydraulic excavator 1. Also from other directional control valves (not shown), the pressurized oil is supplied to other hydraulic actuators (for example, a hydraulic motor for revolving, a hydraulic motor for driving, or other hydraulic cylinders).

Herein, when the above-mentioned auto-idle selection switch (not shown) is opened, the controller 61 composed of the vehicle body control device 62 and the engine control device 63 controls the rotational speed of the engine 10 in accordance with the instruction value (target rotational speed) from the rotational speed instruction device 59. However, when the auto-idle selection switch is closed and all directional control valves such as the directional control valve 37 are held in the neutral position by the operation detector 58, the rotational speed of the engine 10 can be controlled in accordance with an auto-idle speed regardless of the instruction value. Therefore, in a case where all hydraulic actuators continue to be in a stationary state over a prescribed period of time, the rotational speed of the engine 10 can be reduced to the auto-idle speed (i.e., rotational speed for unload operation), enabling saving or reduction of the energy consumption or reduction of the noise.

On the other hand, during the operation of the engine 10, particulate matter being a harmful substance is discharged from the exhaust pipe 11. However, at this time, the exhaust gas purifying device 16 can oxidize and remove hydrocarbon (HC), nitrogen oxides (NO) and carbon monoxide (CO) in the exhaust gas by the oxidation catalyst 18. The particulate matter removing filter 19 collects the particulate matter contained in the exhaust gas and burns the collected particulate matter for removal (regeneration). Thus, the purified exhaust gas can be discharged to the outside from the downstream discharge port 20.

Meanwhile, when the auto-idle control is being performed by the controller 61 as described above, the rotational speed of the engine 10 is kept low. Therefore, the temperature of the exhaust gas becomes lower than a temperature required for the regeneration of the particulate matter removing filter 19 of the exhaust gas purifying device 16, so that the particulate matter removing filter 19 easily causes clogging of the filter due to the accumulation of the particulate matter.

Figure 7:
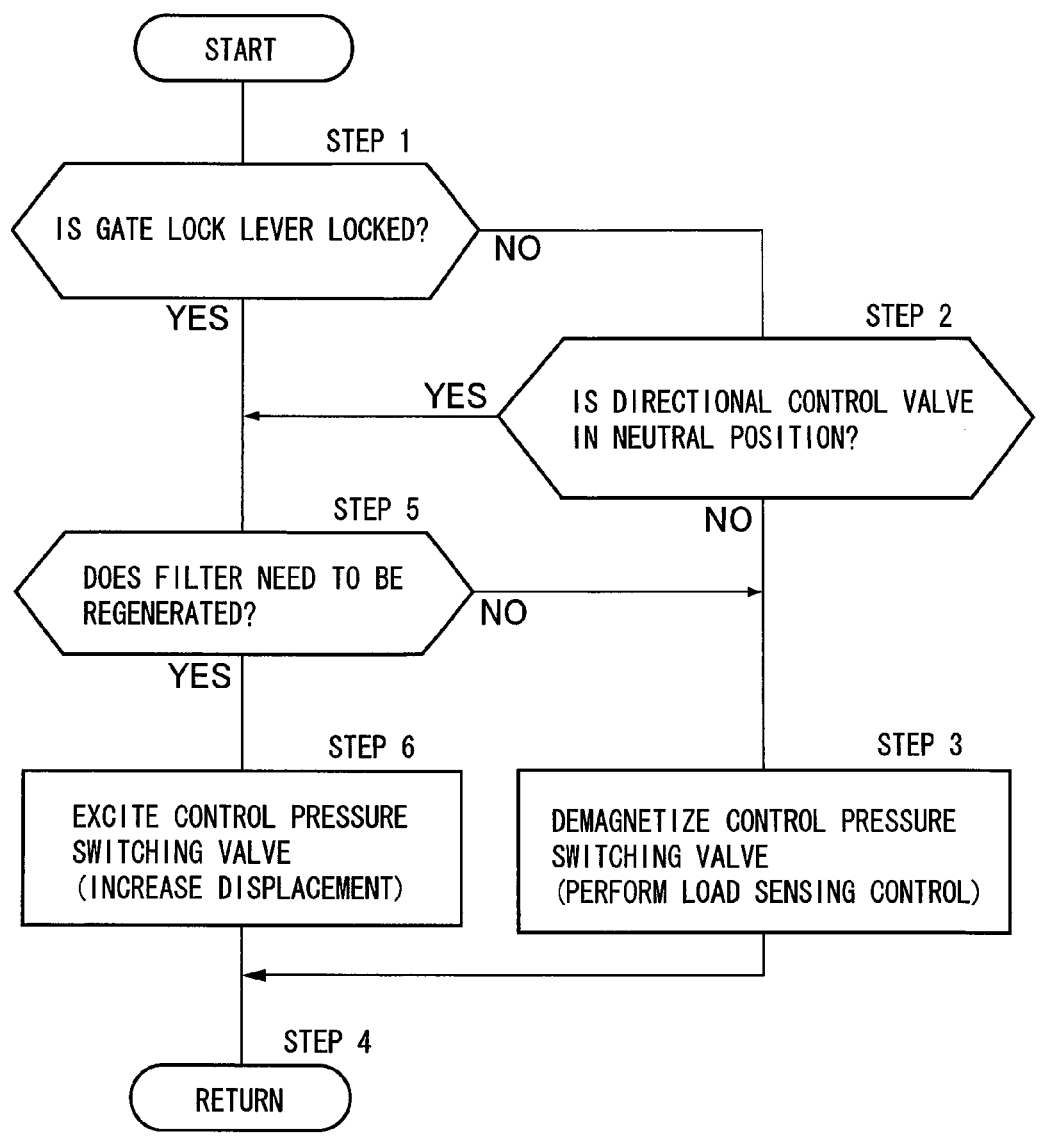
FIG. 7 is a flowchart showing a switching-control process of the control pressure switching valve by a controller.

Therefore, the first embodiment is configured such that in the controller 61 composed of the vehicle body control device 62 and the engine control device 63, the switching-control of the control pressure switching valve 57 is performed in accordance with the program shown in FIG. 7. In other words, it is configured such that the delivery displacement of the hydraulic pump 13 is increased from a small displacement state to a large displacement state by switching the control pressure switching valve 57 from the load sensing control position (j) to the load sensing control release position (k), thereby increasing the rotational load of the engine 10 as required during the auto-idle control of the engine 10.

Namely, once the process shown in FIG. 7 is started by the operation of the engine 10, in Step 1, whether or not the gate lock switch 50 is opened (OFF), i.e., whether or not the gate lock valve 49 is in the lock position (f) is determined. As long as the answer is "NO" in Step 1, the gate lock valve 49 is not in the lock position (f) but switched to the operating position (g).

In next Step 2, whether or not the operator has tilted the operating lever of the pilot valve 48, i.e., whether or not the directional control valve 37 is in the neutral position (c) is determined in accordance with the detection signal from the operation detector 58. When the answer is "NO" in Step 2, the directional control valve 37 is switched from the neutral position (c) to the switching position (d), as shown in FIG. 4, for example, where the hydraulic cylinder 33 is being driven in the contraction direction by the supply of the pressurized oil.

Therefore, even during the auto-idle control of the engine 10, the rotational speed of the engine is increased to a rotational speed corresponding to the instruction value (target rotational speed) from the rotational speed instruction device 59 in accordance with the switching-control of the directional control valve 37, whereby the rotational load associated with the operation of the hydraulic cylinder 33 acts on the engine 10. Consequently, the temperature of the exhaust gas of the engine 10 reaches a temperature required for the regeneration of the particulate matter removing filter 19 of the exhaust gas purifying device 16.

In next Step 3, as shown in FIG. 4, the control pressure switching valve 57 is demagnetized and put in the load sensing control position (j). Thus, the load sensing control pressure PLS is supplied from the pressure control valve 44 in the valve unit 32, through the signal pressure lead-out line 45 and the signal pressure line 46, to the hydraulic pilot portion 29B of the displacement control valve 29. In this case, the displacement control valve 29 is switched from the large displacement position (a) to the small displacement position (b) as the pilot pressure to be supplied to the hydraulic pilot portion 29B (i.e., the load sensing control pressure PLS) becomes higher than the pilot pressure to be supplied to the hydraulic pilot portion 29A (i.e., the load sensing target differential pressure $\Delta$Pt, which increases or decreases depending on the rotational speed of the engine).

As described above, when the displacement control valve 29 is switched to the small displacement position (b), the load sensing control tilting actuator 28 of the displacement regulator 26 tilts the displacement variable portion 13A in the direction of the arrow SV against the returning spring 26A to have a smaller tilting angle, thereby reducing the delivery displacement of the hydraulic pump 13 to decrease the flow rate of the pressurized oil delivered from the hydraulic pump 13. However, the load sensing control pressure PLS to be outputted from the pressure control valve 44 in the valve unit 32 relatively decreases as the delivery rate of the pressurized oil from the hydraulic pump 13 decreases. Therefore, in the displacement regulator 26, the displacement control valve 29 switches from the small displacement position (b) to the large displacement position (a) as the load sensing control pressure PLS becomes lower than the load sensing target differential pressure ΔPt.

On the other hand, the displacement control valve 29 switches from the large displacement position (a) to the small displacement position (b) again as the flow rate of the pressurized oil delivered from the hydraulic pump 13 increases to make the load sensing control pressure PLS higher than the load sensing target differential pressure ΔPt. As described above, the displacement control valve 29 operates to repeatedly switch between the large displacement position (a) and the small displacement position (b) depending on the load sensing control pressure PLS and the load sensing target differential pressure ΔPt.

Therefore, the displacement regulator 26 can control the delivery displacement of the hydraulic pump 13 such that the delivery pressure of the hydraulic pump 13 becomes higher than the maximum load pressure of the plurality of hydraulic actuators by a target differential pressure, and thus energy savings can be promoted. On the other hand, during an unload time when all hydraulic actuators are stationary, the rotational load of the engine can be reduced by controlling the delivery displacement of the hydraulic pump 13 to a flow rate close to a minimum, which also promotes energy savings. In next Step 4, return to Step 1 to continue the process thereafter.

Next, in a case where the answer is "YES" in Step 1, the gate lock switch 50 is in the lock position, which means that the gate lock valve 49 is returned to the lock position (f), resulting in an unload time when all hydraulic actuators are stationary. In addition, in a case where the answer is "YES" in Step 2, all directional control valves including the directional control valve 37 are in the neutral position, so that the delivery displacement of the hydraulic pump 13 is controlled to be a flow rate close to a minimum by the displacement regulator 26.

Therefore, in next Step 5, whether or not the particulate matter removing filter 19 of the exhaust gas purifying device 16 has reached the time to be regenerated, i.e., the filter regeneration time is determined from the detection signals, for example, from the gas pressure sensors 22, 23. This judgment in Step 5 is made based on the pressure difference ΔP obtained by the aforementioned formula 1. As long as the answer is "No" in Step 5, the filter regeneration time has not arrived yet, so that in next Step 3, the control valve switching valve 57 is demagnetized and held in the load sensing control position (j).

However, when the answer is "YES" in Step 5, the particulate matter removing filter 19, which has reached the filter regeneration time, easily causes clogging of the filter due to the accumulation of the particulate matter. As a result, in next Step 6, the control pressure switching valve 57 is excited and switched from the load sensing control position (j) to the load sensing control release position (k).

Thus, as shown in FIG. 6, the signal pressure line 46 disposed between the hydraulic pilot portion 29B of the displacement control valve 29 and the pressure control valve 44 is connected to the tank 14. Therefore, the load sensing control pressure PLS to be supplied to the hydraulic pilot portion 29B of the displacement control valve 29 can be reduced to the prescribed low pressure value (tank pressure). Consequently, the displacement control valve 29 of the displacement regulator 26 is switched from the small displacement position (b) to the large displacement position (a), whereby the displacement variable portion 13A of the hydraulic pump 13 is tilted in the direction of the arrow LV by the spring force of the returning spring 26A.

In this case, the delivery displacement of the hydraulic pump 13, which has been driven by the engine 10 at a point 65 in FIG. 8 (for example, at a position of a pressure Pa and a delivery rate Qa), is increased with the displacement variable portion 13A tilted in the direction of the arrow LV toward the large tilting position. Thus, the hydraulic pump 13 is driven by the engine 10 at a point 66 in FIG. 8 (for example, at a position of the pressure Pa and a delivery rate Qb).

As described above, since the delivery displacement of the hydraulic pump 13 can be increased by exciting the control pressure switching valve 57, the rotational load of the engine 10 can be increased. As the load of the engine 10 increases, the temperature of the exhaust gas discharged from the engine 10 can be raised to a temperature required for the regeneration process of the particulate matter removing filter 19. As a result, the removal of particulate matter at the exhaust gas purifying device 16 can be ensured by properly performing the regeneration process of the particulate matter removing filter 19.

Therefore, according to the first embodiment, based on whether the gate lock switch 50 is opened or closed, the unload time when all hydraulic actuators are stationary can be recognized by detecting whether or not a plurality of directional control valves (including the directional control valve 37) are in the neutral position. In addition, whether or not the plurality of directional control valves are in the neutral position, namely, the unload time when all hydraulic actuators are stationary can also be detected by the detection signal from the operation detector 58.

During the unload time of such hydraulic actuators, when the particulate matter removing filter 19 of the exhaust gas purifying device 16 has reached the time to be regenerated, the load sensing control pressure PLS can be reduced to the tank pressure by switching the control pressure switching valve 57 from the load sensing control position (j) to the load sensing control release position (k). Therefore, the delivery displacement of the hydraulic pump 13 can be increased, and the rotational load of the engine 10 can be increased. As a result, the temperature of the exhaust gas from the engine 10 can be raised to a temperature required for the regeneration of the particulate matter removing filter 19, facilitating the regeneration of the particulate matter removing filter 19.

It should be noted that, in the first embodiment, the description was made by taking, as an example, the case where whether or not a plurality of directional control valves (including the directional control valve 37) are in the neutral position is determined based on whether or not the gate lock lever is in a locked state in Step 1 of FIG. 7. However, the present invention is not limited to the above case but may be configured such that whether or not the plurality of directional control valves (including the directional control valve 37) are in the neutral position is determined by, for example, the detection signal from the operation detector 58, regardless of whether or not the gate lock lever is in a locked state.

In this case, the process of Step 1 shown in FIG. 7 may be omitted. Furthermore, the same control as in the first embodiment may be performed in a state where the gate lock valve 49 shown in FIG. 6 is not in the lock position (f) but remains switched to the operating position (g). Namely, when directional control valves (including the directional control valve 37) are in the neutral position and the filter regeneration time has already arrived, the regeneration of the filter of the exhaust gas purifying device 16 can be automatically performed by switching the control pressure switching valve 57 to the load sensing control release position (k).

Next, FIG. 9 shows a plurality of valve units and a plurality of hydraulic actuators as a modification of the first embodiment. In this modification, the component elements that are identical to those in the foregoing first embodiment will be simply denoted by the same reference numerals to avoid repetitions of similar explanations.

In the drawing, designated at 71 is another valve unit disposed in parallel with the valve unit 32 with respect to the hydraulic pump 13 and the tank 14 constituting a hydraulic source, the valve unit 71 controlling the operation of a hydraulic cylinder 72 as another hydraulic actuator. The valve unit 71 is constructed in almost the same manner as the valve unit 32 and provided with a pressurized oil supply line 73 connected to the delivery line part 31B of the delivery line 31, a discharge line 74 connected to the tank 14, a below-mentioned directional control valve 75, a pressure compensating valve 76, load pressure lead-out lines 77, 79, 80, a shuttle valve 78, and a signal pressure line 81.

The valve unit 71 is provided with a detecting line 71A for detecting whether or not the directional control valve 75 is in the neutral position (c) with the pressure sensor 58B. However, the valve unit 71 is not provided with the high pressure relief valve 36, the unload valve 43 and the pressure control valve 44 which are provided in the valve unit 32.

Indicated at 75 is a directional control valve for controlling the movement of the hydraulic cylinder 72. The directional control valve 75 controls the hydraulic cylinder 72 to expand, contract or stop by selectively allowing the supply line 73 and the discharge line 74 of the valve unit 71 to communicate with a pair of main lines 72A, 72B of the hydraulic cylinder 72 or shutting off the communication. The directional control valve 75 has left side and right side hydraulic pilot portions 75A, 75B and is switched from the neutral position (c) to either the left side switching position (d) or to the right side switching position (e) depending on pilot pressures supplied from a below-mentioned pilot valve 82 to the hydraulic pilot portions 75A, 75B.

At this time, the directional control valve 75 controls the flow rate of the pressurized oil to be supplied from the hydraulic pump 13 to the hydraulic cylinder 72 through the delivery line part 31B of the delivery line 31 and the supply line 73, varying the contraction and expansion speed of the hydraulic cylinder 72 in accordance with the flow rate. The directional control valve 75 has a load port 75C connected to a pressure receiving portion 76B of the below-mentioned pressure compensating valve 76 through the load pressure lead-out line 77. When the directional control valve 75 is switched from the neutral position (c) to either the switching position (d) or the switching position (e), the load port 75C is connected to the higher pressure one of the main lines 72A, 72B. Therefore, the load pressure of the hydraulic cylinder 72, namely, the downstream side pressure of a meter-in throttle of the directional control valve 75 is led to the pressure receiving portion 76B of the pressure compensating valve 76 through the below-mentioned load pressure lead-out line 77.

The pressure compensating valve 76 is disposed upstream of the directional control valve 75 in the supply line 73. The pressure compensating valve 76 is constructed in the same manner as the pressure compensating valve 38 in the valve unit 32, and during a combined operation of a plurality of hydraulic actuators, compensates the pressure of the pressurized oil to be supplied to the hydraulic cylinder 72. Therefore, the pressure compensating valve 76 has pressure receiving portions 76A, 76B that can operate in an open direction and a pressure receiving portion 76C that can operate in a closing direction. Among the pressure receiving portions 76A to 76C, the load sensing control pressure PLS is led to the pressure receiving portion 76A from the pressure control valve 44 of the valve unit 32 through the below-mentioned signal pressure line 81. The load pressure of the hydraulic cylinder 72 (the downstream side pressure of the meter-in throttle of the directional control valve 75) is led to the pressure receiving portion 76B of the pressure compensating valve 76 through the load port 75C of the directional control valve 75 and the load pressure lead-out line 77. The upstream side pressure of the meter-in throttle of the directional control valve 75 is led to the pressure receiving portion 76C.

The shuttle valve 78 constitutes a part of a maximum load pressure detection circuit, the shuttle valve 78 being disposed between the load pressure lead-out line 79 along which load pressures of other hydraulic actuators (not shown) are led and the load pressure lead-out line 77 connected to the load port 75C of the directional control valve 75. The shuttle valve 78 selects the pressure in the higher pressure one of the load pressure lead-out lines 77, 79 and leads the selected higher pressure into the other load pressure lead-out line 80. The load pressure lead-out line 80 is connected to the load pressure lead-out line 41 of the valve unit 32. Thus, from the shuttle valve 40 in the valve unit 32, the highest load pressure (maximum load pressure) among the plurality of the hydraulic actuators is led to the maximum load pressure line 42.

Indicated at 81 is a signal pressure line disposed in the valve unit 71, the signal pressure line 81 being connected at one side to the signal pressure lead-out line 45 of the valve unit 32 and connected at the other side to the pressure receiving portion 76A of the pressure compensating valve 76. The signal pressure line 81 leads the load sensing control pressure PLS, which is outputted from the pressure control valve 44 in the valve unit 32, to the pressure receiving portion 76A of the pressure compensating valve 76. Thus, the pressure compensating valve 76 takes in the output pressure of the pressure control valve 44 led to the pressure receiving portion 76A (namely, the load sensing control pressure PLS) as a target compensating differential pressure and controls to equalize the differential pressure between the front and rear sides of the directional control valve 75 with the target compensating differential pressure.

Indicated at 82 is a pressure reducing valve type pilot operating valve for controlling the hydraulic cylinder 72 remotely (hereinafter referred to as pilot valve 82). The pilot valve 82 is constructed in the same manner as the foregoing pilot valve 48, where a pump port 82P is connected to the second pilot line 25B (i.e., the pilot pump 24) through the gate lock valve 49, while a tank port 82T is connected to the tank 14.

Output ports 82A, 82B of the pilot valve 82 are connected to the hydraulic pilot portions 75A, 75B of the directional control valve 75, respectively, through a pair of pilot lines (not shown). When an operating lever associated therewith (not shown) is tilted by an operator with the gate lock valve 49 switched from the lock position (f) to the operating position (g), the pilot valve 82 supplies pilot pressures corresponding to the operation to the hydraulic pilot portions 75A, 75B of the directional control valve 75. Thus, the directional control valve 75 can be switched from the neutral position (c) shown in FIG. 9 to either the switching position (d) or the switching position (e).

Therefore, also in the modification thus constructed, during the unload time of all hydraulic actuators including the hydraulic cylinders 33, 72, whether or not the particulate matter removing filter 19 of the exhaust gas purifying device 16 has reached the time to be regenerated can be determined in the same manner as in the process shown in FIG. 7. When the regeneration process should be performed for the exhaust gas purifying device 16, the load sensing control pressure PLS can be reduced to the tank pressure by switching the control pressure switching valve 57 from the load sensing control position (j) to the load sensing control release position (k). As a result, the same effect as in the foregoing first embodiment can also be obtained in this modification.

Figure 10:
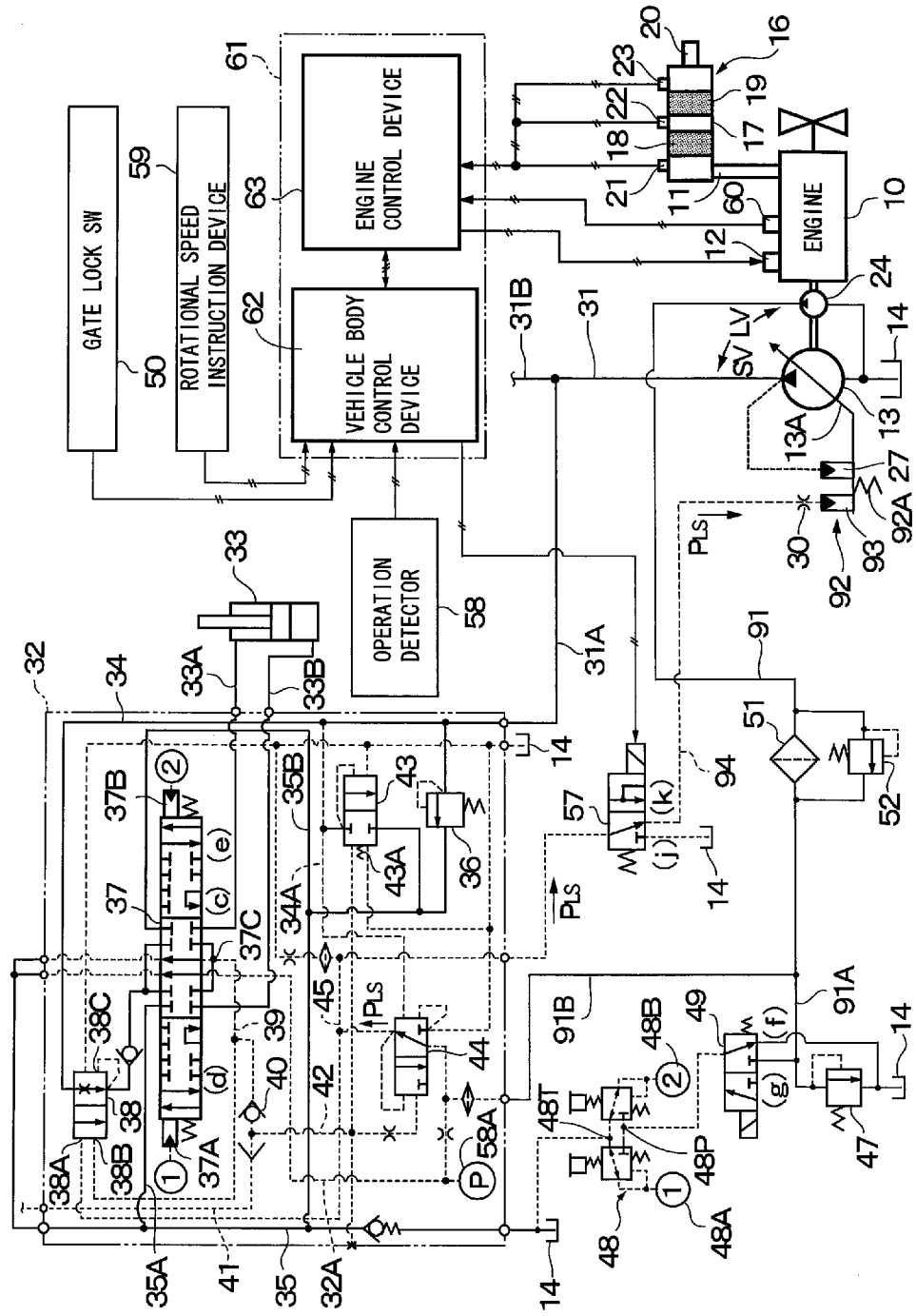
FIG. 10 is an entire configuration diagram showing a load sensing control hydraulic circuit according to a second embodiment.

Furthermore, FIG. 10 shows a second embodiment of the present invention. In the second embodiment, the component elements that are identical to those in the foregoing first embodiment will be simply denoted by the same reference numerals to avoid repetitions of similar explanations. However, the second embodiment is characterized in that the displacement variable portion 13A of the hydraulic pump 13 is configured to be directly tilted by the load sensing control pressure PLS outputted from the pressure control valve 44 in the valve unit 32.

In the drawing, indicated at 91 is a pilot line connected to the delivery side of the pilot pump 24, the pilot line 91 being used in place of the pilot line 25 described in the first embodiment. The pilot line 91 branches into first and second pilot lines 91A, 91B at a position downstream of the filter 51 and the relief valve 52. The first pilot line 91A of the pilot line 91 is connected to the tank 14 through the low pressure relief valve 47 in the same manner as the second pilot line 25B described in the first embodiment. The second pilot line 91B supplies the pressurized oil (pilot pressure) from the pilot pump 24 to the pressure control valve 44 in the valve unit 32 in the same manner as the third pilot line 25C described in the first embodiment.

Designated at 92 is a displacement regulator employed in the second embodiment, the displacement regulator 92 being constructed in almost the same manner as the displacement regulator 26 described in the first embodiment, including the horsepower control tilting actuator 27 and a load sensing control tilting actuator 93. The displacement regulator 92 is provided with a returning spring 92A for tilting the displacement variable portion 13A of the hydraulic pump 13 in the direction of the arrow LV to have a larger displacement. However, the displacement control valve 29 described in the first embodiment is not employed.

Therefore, the load sensing control tilting actuator 93 of the displacement regulator 92 tilts the displacement variable portion 13A of the hydraulic pump 13 in accordance with the load sensing control pressure PLS outputted from the pressure control valve 44 through a signal pressure line 94. Namely, the horsepower control tilting actuator 27 and the load sensing control tilting actuator 93 are composed of hydraulic cylinders for tilting the displacement variable portion 13A of the hydraulic pump 13, where the tilting angle of the displacement variable portion 13A can be variably set in accordance with the pressure of the pressurized oil supplied to or discharged from the respective hydraulic cylinders.

The signal pressure line 94 is connected at one side to the pressure control valve 44 in the valve unit 32 through the signal pressure lead-out line 45 in the same manner as the signal pressure line 46 described in the first embodiment. In the halfway of the signal pressure line 94, there is disposed the control pressure switching valve 57 described in the first embodiment. However, the signal pressure line 94 is different from the first embodiment in that the other side is connected to the load sensing control tilting actuator 93 through the throttle 30.

The signal pressure line 94 disposed between the load sensing control tilting actuator 93 of the displacement regulator 92 and the pressure control valve 44 permits the load sensing control pressure PLS from the pressure control valve 44 to be supplied to the load sensing control tilting actuator 93 as long as the control pressure switching valve 57 is being held in the load sensing control position (j). However, when the control pressure switching valve 57 is switched to the load sensing control release position (k), the signal pressure line 94 is connected to the tank 14. Consequently, the load sensing control pressure PLS to be supplied to the load sensing control tilting actuator 93 is reduced to the prescribed low pressure value (tank pressure).

Here, until the filter regeneration process is performed for the particulate matter removing filter 19 of the exhaust gas purifying device 16 (namely, during normal times when the filter regeneration process is not demanded), the control pressure switching valve 57 is demagnetized and held in the load sensing control position (j). Therefore, the output pressure of the pressure control valve 44 (namely, the load sensing control pressure PLS) is directly supplied to the load sensing control tilting actuator 93 of the displacement regulator 92 through the signal pressure lead-out line 45, the signal pressure line 94 and the throttle 30.

Therefore, in a case where the load sensing control pressure PLS increases, the displacement variable portion 13A of the hydraulic pump 13 is tilted in the direction of the arrow SV to have a smaller tilting angle against the returning spring 92A, but in a case where the aforementioned pressure decreases, the displacement variable portion 13A is tilted in the direction of the arrow LV to have a larger tilting angle by the returning spring 92A. In other words, the pressure control valve 44 in the valve unit 32 supplies the variably controlled load sensing control pressure PLS to the load sensing control tilting actuator 93 such that the delivery pressure of the hydraulic pump 13 becomes higher than the maximum load pressure of the maximum load pressure line 42 by a target differential pressure.

Namely, when the delivery pressure of the hydraulic pump 13 becomes high relative to the maximum load pressure and exceeds the target differential pressure, the load sensing control pressure PLS is increased to make the load sensing control tilting actuator 93 push the displacement variable portion 13A in the direction of the arrow SV. Therefore, in the hydraulic pump 13, the tilting angle of the displacement variable portion 13A is decreased to reduce the delivery rate of the pressurized oil, so that the pressurized oil in the delivery line 31 can be prevented from being excessively discharged to the tank 14.

On the other hand, when the delivery pressure of the hydraulic pump 13 becomes low relative to the maximum load pressure and drops below the target differential pressure, the pressure control valve 44 executes the pressure reduction control to reduce the load sensing control pressure PLS. Consequently, in accordance with a decrease in the load sensing control pressure PLS, the displacement regulator 92 tilts the displacement variable portion 13A in the direction of the arrow LV by the spring force of the returning spring 92A, thereby increasing the delivery displacement of the hydraulic pump 13. In this case, since the flow rate of the pressurized oil to be delivered from the hydraulic pump 13 is relatively insufficient, the delivery displacement of the hydraulic pump 13 can be increased to ensure the flow rate for the target differential pressure.

However, the displacement control valve 29, the throttle 53, the flow rate adjusting valve 54 and the pressure generating valve 55 employed in the first embodiment are not employed in the second embodiment. Therefore, the load sensing target differential pressure $\Delta Pt$, which increases or decreases depending on the rotational speed of the engine 10, cannot be used as a variable control value (namely, parameter) for controlling the displacement of the hydraulic pump 13. However, even in this case, the delivery rate of the pressurized oil delivered from the hydraulic pump 13 can be variably controlled by supplying the load sensing control pressure PLS from the pressure control valve 44 in the valve unit 32 to the load sensing control tilting actuator 93.

As a result, also in the second embodiment thus constructed, the delivery displacement of the hydraulic pump 13 can be controlled by the displacement regulator 92 such that the delivery pressure of the hydraulic pump 13 becomes higher than the maximum load pressure of a plurality of hydraulic actuators by a target differential pressure, and thus energy savings can be promoted as in the first embodiment. On the other hand, during an unload time when all hydraulic actuators are stationary, the rotational load of the engine can be reduced by controlling the delivery displacement of the hydraulic pump 13 to a flow rate close to a minimum, which also promotes energy savings.

Furthermore, as in the process shown in FIG. 7, when the controller 61 determines that the particulate matter removing filter 19 of the exhaust gas purifying device 16 has reached the time to be regenerated based on the detection signals from the gas pressure sensors 22, 23, the control pressure switching valve 57 is excited and switched from the load sensing control position (j) to the load sensing control release position (k). Thus, the signal pressure line 94 disposed between the load sensing control tilting actuator 93 of the displacement regulator 92 and the pressure control valve 44 can be connected to the tank 14 to reduce the load sensing control pressure PLS, which is to be supplied to the load sensing control tilting actuator 93, to the prescribed low pressure value (tank pressure).

As a result, the displacement variable portion 13A of the hydraulic pump 13 is tilted by the returning spring 92A of the displacement regulator 92 in the direction of the arrow LV toward the large tilting position. This results in increasing the delivery displacement of the hydraulic pump 13, thereby increasing the rotational load of the engine 10. Therefore, the temperature of the exhaust gas discharged from the engine 10 can be raised to a temperature required for the regeneration process of the particulate matter removing filter 19, and the lifetime and reliability of the exhaust gas purifying device 16 can be improved by properly performing the regeneration process of the particulate matter removing filter 19.

Figure 11:
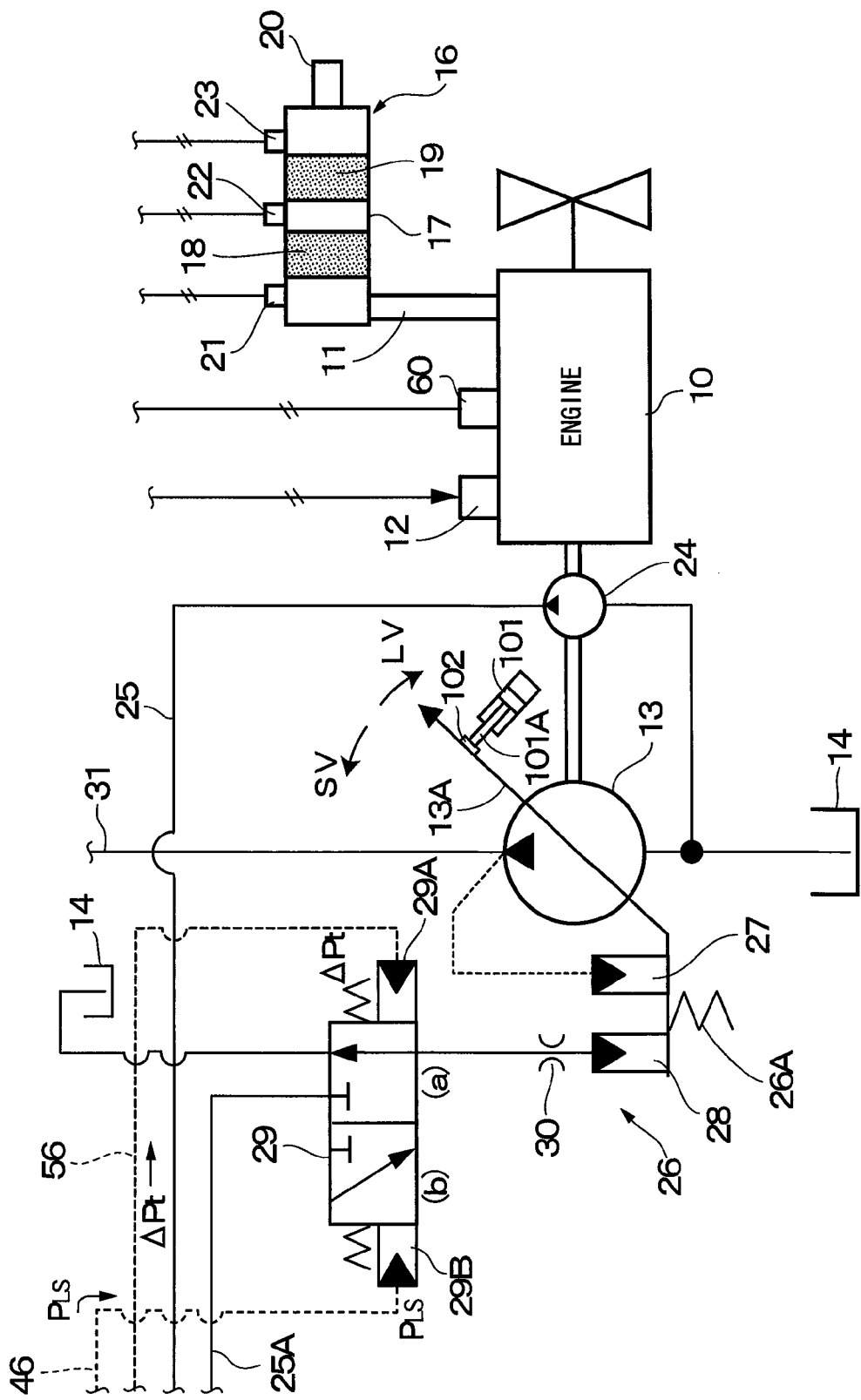
FIG. 11 is a partial configuration diagram showing a part of a load sensing control hydraulic circuit according to a third embodiment in an enlarged scale.

Next, FIG. 11 shows a third embodiment of the present invention. In the third embodiment, the component elements that are identical to those in the foregoing first embodiment will be simply denoted by the same reference numerals to avoid repetitions of similar explanations. However, the third embodiment is characterized by providing the hydraulic pump 13 with a regulation cylinder 101 which serves as a tilting position limiting device.

Here, the regulation cylinder 101 is provided with an extensible and retractable rod 101A, where a stopper 102 capable of coming into contact with or moving away from the displacement variable portion 13A of the hydraulic pump 13 is disposed at the protruding end side of the rod 101A as a tilting position limiting member. That is, when the rod 101A of the regulation cylinder 101 is retracted, the displacement variable portion 13A can be tilted between the maximum tilting position and the minimum tilting position by the displacement regulator 26 as in the first embodiment. In this case, the stopper 102 is located apart from the displacement variable portion 13A, thus never coming into contact with the displacement variable portion 13A.

However, when the control pressure switching valve 57 (see FIG. 6) is excited and switched from the load sensing control position (j) to the load sensing control release position (k) by the control signal from the controller 61, the rod 101A of the regulation cylinder 101 is extended to bring the stopper 102 into contact with the displacement variable portion 13A. Therefore, the stopper 102 can limit the tilting position of the displacement variable portion 13A of the hydraulic pump 13 within a prescribed range.

In other words, the stopper 102 provided as a tilting position limiting member prevents the displacement variable portion 13A of the hydraulic pump 13 from being tilted beyond the necessary position in the direction of the arrow LV in FIG. 11. Therefore, the displacement of the hydraulic pump 13 can be controlled at a point 103 in FIG. 8 (at a position of the pressure Pa and a delivery rate Qc). In this case, when the control pressure switching valve 57 is switched from the load sensing control position (j) to the load sensing control release position (k), the displacement variable portion 13A is tilted in the direction of the arrow LV toward the maximum tilting position, so that the hydraulic pump 13, which has been driven by the engine 10 at the point 65 in FIG. 8 (at the position of the pressure Pa and the delivery rate Qa), is then driven by the engine 10 at the point 103.

Thus, the rotational load of the engine 10 can be reduced more than in the first embodiment in which the hydraulic pump 13 is driven by the engine 10 at the point 66 in FIG. 8 (at the position of the pressure Pa and the delivery rate Qb). That is, the engine 10 can raise the temperature of the exhaust gas to the minimum temperature required for performing the regeneration process of the particulate matter removing filter 19 by rotating the hydraulic pump 13 at the point 103 shown in FIG. 8, thereby preventing the temperature of the exhaust gas from increasing more than necessary.

As described above, also in the third embodiment thus constructed, when the control pressure switching valve 57 is switched from the load sensing control position (j) to the load sensing control release position (k), the displacement variable portion 13A can be tilted by the displacement regulator 26 in the direction of the arrow LV toward the large tilting position to increase the rotational load of the engine 10, so that the same effect as in the first embodiment can be obtained.

However, in the third embodiment, when the control pressure switching valve 57 is switched to the load sensing control release position (k), the rod 101A of the regulation cylinder 101 is extended to bring the stopper 102 into contact with the displacement variable portion 13A. Therefore, the tilting position of the displacement variable portion 13A can be limited within a prescribed range to prevent the tilting angle from exceeding the limit. At this time, the engine 10 can raise the temperature of the exhaust gas to the minimum temperature required for performing the regeneration process of the particulate matter removing filter 19 by rotating the hydraulic pump 13 at the point 103 shown in FIG. 8, thereby preventing the temperature of the exhaust gas from increasing more than necessary.

Therefore, according to the third embodiment, the regulation cylinder 101 is added to the hydraulic pump 13 as a tilting position limiting device. This prevents the delivery displacement of the hydraulic pump 13 from increasing more than necessary, so that the rotational load of the engine can be increased within the range where the temperature of the exhaust gas of the engine 10 can be raised to a temperature required for the regeneration of the filter.

It should be noted that, in the first embodiment, the control pressure switching valve 57 disposed between the hydraulic pilot portion 29B of the displacement control valve 29 and the pressure control valve 44 is described by taking a solenoid valve as an example. However, the present invention is not limited thereto, and for example, the control pressure switching valve may be a hydraulic pilot type switching valve. In this case, the pilot pressure to be supplied to the control pressure switching valve may be variably controlled by a control signal from the controller to switch the control pressure switching valve between the load sensing control position and the load sensing control release position. In this regard, the same is true for the second and third embodiments.

In the forgoing embodiments, the hydraulic excavator 1 equipped with the swing post type working mechanism 5 is taken as an example for description. However, the construction machine according to the present invention is not limited thereto, but may be applied to a hydraulic excavator equipped with, for example, an offset boom type working mechanism or a monoboom type working mechanism having a boom, an arm and a bucket (a working tool).

Also in the foregoing embodiments, the small-sized hydraulic excavator 1 is taken as an example of the construction machine for description. However, the construction machine according to the present invention is not limited thereto, but may be applied to a medium-sized or much larger hydraulic excavator, for example. It is also applicable to a hydraulic excavator with a wheel type lower traveling structure, a wheel loader, a forklift, or a hydraulic crane, namely, applicable to a wide variety of construction machines adopting a load sensing system.

DESCRIPTION OF REFERENCE NUMERALS

1: Hydraulic excavator
2: Lower traveling structure (Vehicle body)
4: Upper revolving structure (Vehicle body)
5: Working mechanism
6: Revolving frame
9: Counterweight
10: Engine
11: Exhaust pipe
12: Electronic governor
13: Hydraulic pump
13A: Displacement variable portion
14: Tank
15: Heat exchanger
16: Exhaust gas purifying device
17: Casing
18: Oxidation catalyst
19: Particulate matter removing filter
21: Exhaust gas temperature sensor
22, 23: Gas pressure sensor (Pressure detector)
24: Pilot pump
25, 91: Pilot line
26, 92: Displacement regulator
26A, 92A: Returning spring
27: Horsepower control tilting actuator
28, 93: Load sensing control tilting actuator
29: Displacement control valve
31: Delivery line
32, 71: Valve unit
33, 72: Hydraulic cylinder (Hydraulic actuator)
34, 73: Pressurized oil supply line
35, 74: Discharge line
36: High pressure relief valve
37, 75: Directional control valve
38, 76: Pressure compensating valve
39, 41, 77, 79: Load pressure lead-out line
40, 78: Shuttle valve
42: Maximum load pressure line
43: Unload valve
44: Pressure control valve
45: Signal pressure lead-out line
46, 94: Signal pressure line
47: Low pressure relief valve
48, 82: Pilot valve (Pressure reducing valve type pilot operating valve)
49: Gate lock valve
50: Gate lock switch (Operation lock detector)
53: Throttle
54: Flow rate adjusting valve
55: Pressure generating valve
56: Pilot line
57: Control pressure switching valve
58: Operation detector
59: Rotational speed instruction device
60: Rotational sensor
61: Controller (Control device)
62: Vehicle body control device
63: Engine control device
101: Regulation cylinder (Tilting position limiting device)
102: Stopper (Tilting position limiting member)

The invention claimed is:

1. A construction machine, comprising:
an engine being a prime mover;
an exhaust gas purifying device disposed at an exhaust side of said engine and having a filter for purifying exhaust gas;
a pressure detector disposed in said exhaust gas purifying device to detect a differential pressure between front and rear sides of said filter;
a variable displacement type hydraulic pump driven by said engine and having a displacement variable portion;
a displacement regulator configured to variably control a delivery displacement of a pressurized oil by said hydraulic pump;
a hydraulic actuator driven by said pressurized oil delivered from said hydraulic pump;
a directional control valve configured to control a flow rate of said pressurized oil supplied from said hydraulic pump to said hydraulic actuator;
a pressure control valve configured to output a load sensing control pressure (PLS) to said displacement regulator such that a delivery pressure of said hydraulic pump becomes higher than a maximum load pressure of said hydraulic actuator by a target differential pressure;
a controller configured not only to control rotation of said engine but also to perform a filter regeneration process in said exhaust gas purifying device; and
a control pressure switching valve configured to be switched by a control signal from said controller to either a control position, in which said load sensing control pressure is permitted to be outputted without any change from said pressure control valve to said displacement regulator, or a control release position, in which said load sensing control pressure to be outputted to said displacement regulator is reduced to a prescribed low pressure value, is disposed between said displacement regulator and said pressure control valve,
wherein, when the regeneration of said filter is determined to be necessary based on said differential pressure between the front and rear sides of said filter detected by said pressure detector, said controller outputs said control signal, thereby switching said control pressure switching valve from said control position to said control release position, and wherein, when said load sensing control pressure is reduced to said low pressure value with said control pressure switching valve switched from said control position to said control release position, said displacement regulator increases said delivery displacement of said hydraulic pump so as to raise a temperature of said exhaust gas of said engine to a temperature required for the regeneration of said filter, thereby increasing rotational load of said engine.

2. The construction machine according to claim 1, further comprising:
  an operation detector for detecting whether or not said directional control valve is in a neutral position,
  wherein, when said operation detector detects that said directional control valve is in said neutral position and the regeneration of said filter is determined to be necessary, said controller outputs said control signal to switch said control pressure switching valve from said control position to said control release position.

3. The construction machine according to claim 1, further comprising:
  an operation lock detector for detecting whether or not said directional control valve is locked in a neutral position,
  wherein, when said operation lock detector detects that said directional control valve is locked in said neutral position and the regeneration of said filter is determined to be necessary, said controller outputs said control signal to switch said control pressure switching valve from said control position to said control release position.

4. The construction machine according to claim 1, wherein said displacement variable portion of said hydraulic pump is configured to be tilted by said displacement regulator to vary said delivery displacement of said pressurized oil, and
  wherein said hydraulic pump is provided with a tilting position limiting device configured to permit said displacement variable portion to be tilted by said displacement regulator between a maximum tilting position and a minimum tilting position as long as said control pressure switching valve is being held in said control position and limit a tilting position of said displacement variable portion within a prescribed range in a case where said control pressure switching valve is switched from said control position to said control release position by said control signal from said controller.

5. The construction machine according to claim 1, further comprising:
  a plurality of said hydraulic actuators and a plurality of said directional control valves, as well as a plurality of pressure compensating valves for controlling each differential pressure between front and rear sides of said plurality of directional control valves,
  wherein said pressure control valve controls said load sensing control pressure to be higher than said maximum load pressure of said plurality of hydraulic actuators by a target differential pressure.

* * * * *